US010408643B2

(12) United States Patent
Chellamuthu et al.

(10) Patent No.: US 10,408,643 B2
(45) Date of Patent: Sep. 10, 2019

(54) METHODS AND APPARATUS TO INCREASE RESOLVER-TO-DIGITAL CONVERTER ACCURACY

(71) Applicant: TEXAS INSTRUMENTS INCORPORATED, Dallas, TX (US)

(72) Inventors: Shanmuganand Chellamuthu, Richardson, TX (US); Viktor Tasevski, Richardson, TX (US); Ted F. Lekan, Chicago, IL (US); Fei Xu, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 184 days.

(21) Appl. No.: 15/276,348

(22) Filed: Sep. 26, 2016

(65) Prior Publication Data
US 2018/0052013 A1 Feb. 22, 2018

Related U.S. Application Data

(60) Provisional application No. 62/376,797, filed on Aug. 18, 2016.

(51) Int. Cl.
*G01D 5/243* (2006.01)
*G01D 5/20* (2006.01)

(52) U.S. Cl.
CPC ............ *G01D 5/243* (2013.01); *G01D 5/2073* (2013.01)

(58) Field of Classification Search
CPC ............................. G01D 5/243; G01D 5/2073
USPC ................................................... 324/207.25
See application file for complete search history.

(56) References Cited

U.S. PATENT DOCUMENTS 5,710,509 A * 1/1998 Goto ..................... G01D 5/2073
318/656
2013/0249452 A1* 9/2013 Shinohara ............ G01D 5/2073
318/400.04

OTHER PUBLICATIONS

Analog Devices, "Variable Resolution, 10-Bit to 16-Bit R/D Converter with Reference Oscillator," AD2S1210, 2008-2010, Norwood, MA, USA, 36 pages.

(Continued)

*Primary Examiner* — Reena Aurora
(74) *Attorney, Agent, or Firm* — Lawrence J. Bassuk; Charles A. Brill; Frank D. Cimino

(57) ABSTRACT

Methods, apparatus, systems and articles of manufacture to increase resolver-to-digital converter accuracy are disclosed. Example methods and apparatus compare a first induced signal and a first threshold signal to determine a first zero-cross signal, compare a second induced signal with the first threshold signal to determine a second zero-cross signal, compare an inducing signal with the first threshold signal to determine a third zero-cross signal, compare the first induced signal and a second threshold signal to determine a first zero-cross confirmation signal, the first zero-cross confirmation signal to indicate when to use the first zero-cross signal to determine a phase difference between the inducing signal and at least one of the first induced signal or the second induced signal, and compare the second induced sinusoidal signal and the second threshold signal to determine a second zero-cross confirmation signal, the second zero-cross confirmation signal to indicate when to use the second zero-cross signal to determine the phase difference.

14 Claims, 15 Drawing Sheets

(56) References Cited

OTHER PUBLICATIONS

Martin Staebler, "TMS320F240 DSP Solution for Obtaining Resolver Angular Position and Speed," Application Report, Feb. 2000, Texas Instruments Incorporated, 23 pages.

* cited by examiner

US 10,408,643 B2

METHODS AND APPARATUS TO INCREASE RESOLVER-TO-DIGITAL CONVERTER ACCURACY

RELATED APPLICATION

This patent claims the benefit of U.S. Provisional Application Ser. No. 62/376,797, which was filed on Aug. 18, 2016 entitled, "METHODS AND APPARATUS TO INCREASE RESOLVER-TO-DIGITAL CONVERTER ACCURACY," and is hereby incorporated herein by reference in its entirety.

FIELD OF THE DISCLOSURE

This disclosure relates generally to motor measurement and, more particularly, to methods and apparatus to increase resolver to digital converter accuracy.

BACKGROUND

In recent years, resolvers have been used as angular position sensors for motors. Resolver-to-digital converters ("RDCs") process the analog output signals of resolvers and convert the analog signals into digital signals. When the analog signals approach common-mode, noise or other interference can negatively impact the detection of signal quadrants. In some examples, accurate detection of signal quadrants improves resolver to digital converter accuracy.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1A:
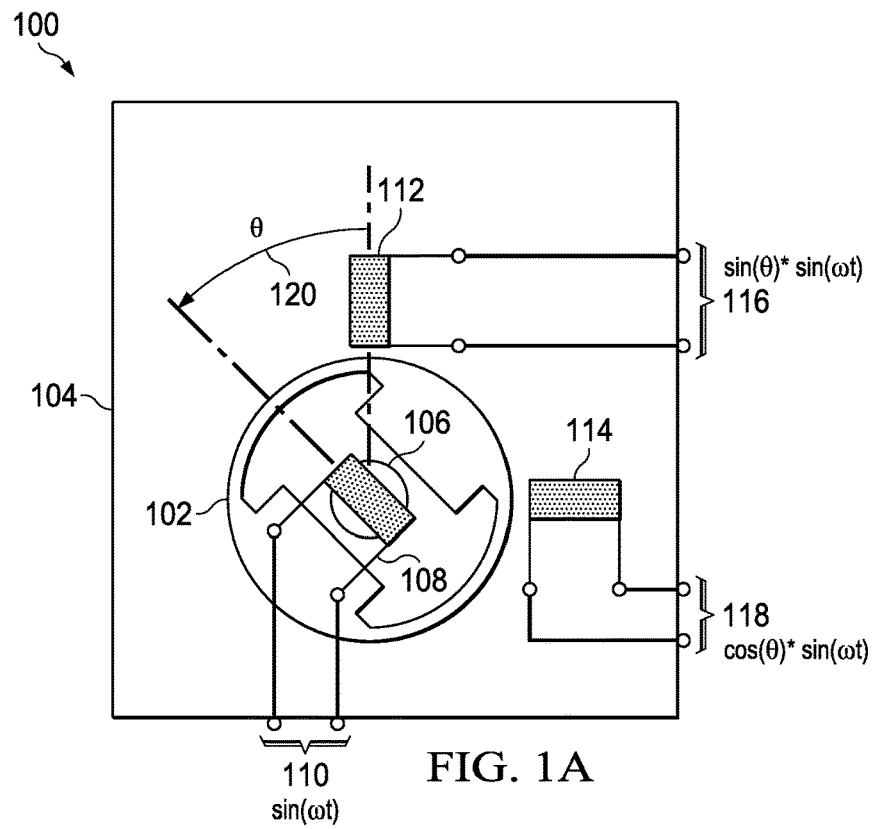
FIG. 1A is an illustration of an example resolver sensor on a motor shaft.

To determine the relative and absolute angular position of a motor at any given time, a resolver sensor is used. A resolver sensor 100 often includes a rotor 102 and a stator 104. The rotor 102 is attached to a motor shaft 106 and rotates when the motor spins. The stator 104 encompasses the rotor 102 and remains stationary as the rotor 102 spins. The example resolver sensor 100 of FIG. 1A includes a first winding 108 mechanically mounted on the rotor 102. The first winding 108 is driven by an exciter sinusoidal signal 110 (e.g., a sine wave). In some examples, an integrated circuit (IC) generates the excited sinusoidal signal 110. An example exciter sinusoidal signal 110 is defined according to Equation 1:

$$\sin(\omega * t) \qquad \text{Equation 1}$$

where ω=excitation frequency in radians/second; t=time in seconds

While the present disclosure references sinusoidal signals, the signals may alternatively be other periodic waveforms, non-periodic waveforms, and/or combinations thereof.

The example resolver sensor 100 of FIG. 1A further includes a second winding 112 and a third winding 114 mechanically mounted on the stator 104. In the illustrated example of FIG. 1A, the second winding 112 is disposed at a ninety-degree rotation from the third winding 114 (e.g., the longitudinal axes of the windings are perpendicular with one another). When the first winding 108 is driven by the exciter sinusoidal signal 110 (e.g., an inducing sinusoidal signal), a first output sinusoidal signal 116 is induced in the second winding 112 and a second output sinusoidal signal 118 is induced in the third winding 114. In some examples, the first output sinusoidal signal 116 and the second output sinusoidal signal 118 are phase shifted by ninety degrees with respect to each other based on the ninety degree rotation in the physical positions of the windings 112, 114. For example, assuming the exciter sinusoidal signal 110 is a sine wave, the first output sinusoidal signal 116 is a sine wave and the second output sinusoidal signal 118 is a cosine wave (e.g., cos(x)=sin(90−x)).

As the rotor 102 spins, a rotor position angle 120 (e.g., θ) changes with respect to the second winding 112 and the third winding 114, thus varying the output sinusoidal signals from the second winding 112 and third winding 114 according to Equations 2 and 3. An example first output sinusoidal signal 116 induced by the example exciter sinusoidal signal 110 of Equation 1 is shown in Equation 2:

$$\sin(\theta)*\sin(\omega*t) \quad \text{Equation 2}$$

An example second output sinusoidal signal 118 induced by the example exciter sinusoidal signal 110 of Equation 1 is shown in Equation 3:

$$\cos(\theta)*\sin(\omega*t) \quad \text{Equation 3}$$

As described above with reference to FIG. 1A, the first output sinusoidal signal 116 and the second output sinusoidal signal 118 are both induced by the exciter sinusoidal signal 110. In the illustrated example of FIG. 1B, the exciter sinusoidal signal 110 is defined as $\sin(w*t)=\sin(2\pi*fc*t)$. In some examples, the exciter sinusoidal signal 110 includes a direct current (DC) offset (e.g., a constant) that forms the longitudinal axis of the exciter signal 110. In some examples, since the induced voltages are AC (Alternating current), the IC imposes a DC voltage on 116 and 118, which is referred to herein as a common-mode reference signal 122.

Figure 1B:
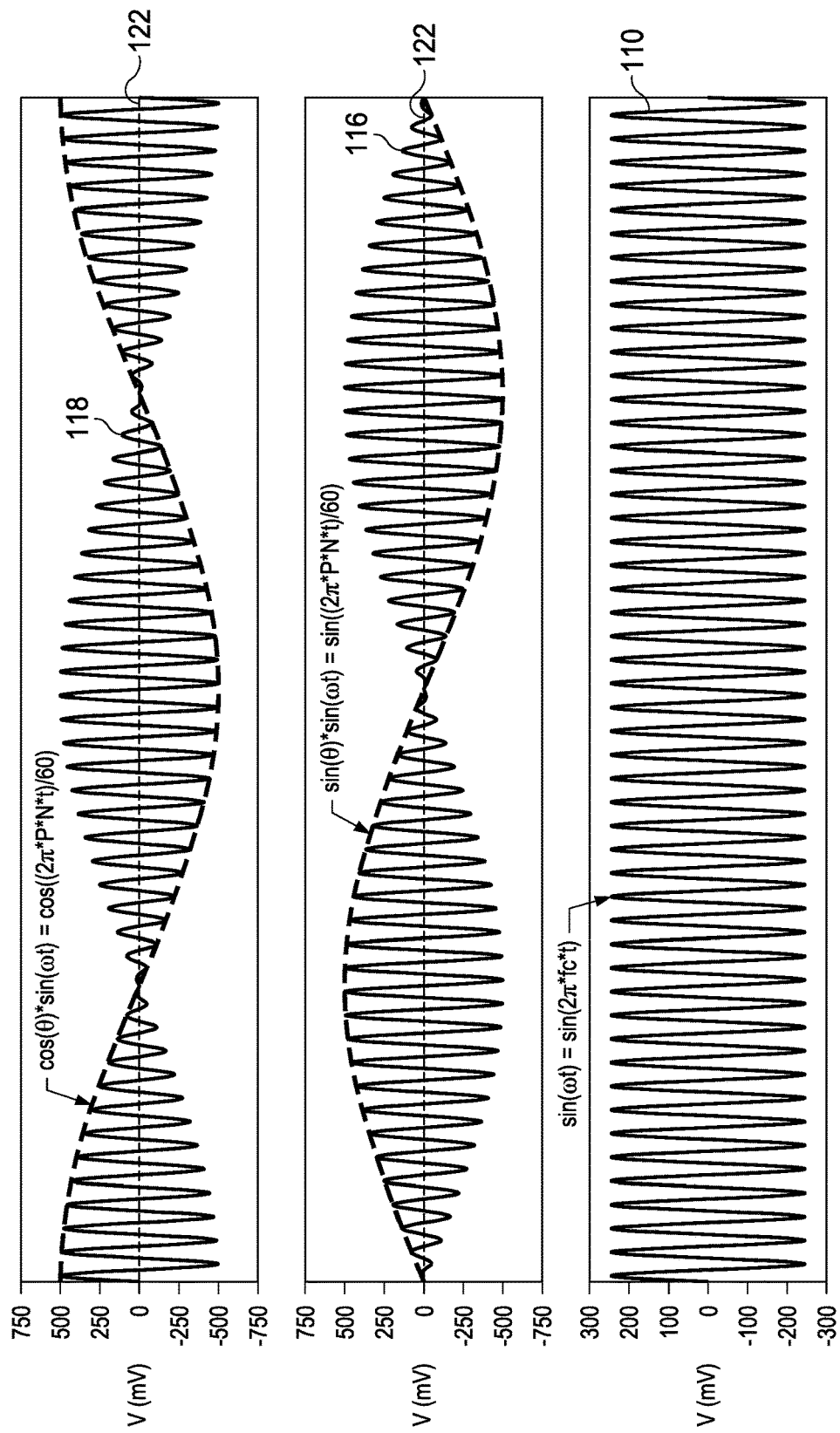
FIG. 1B is a graphical representation of a sinusoidal signal applied as an input to the resolver sensor of FIG. 1A and corresponding sinusoidal signal outputs of the resolver sensor of FIG. 1A.

In the illustrated example of FIG. 1B, the common-mode reference signal 122 (e.g., the DC offset) is zero, the first output sinusoidal signal 116 is defined as $\sin(\theta)*\sin(\omega*t)=\sin((2\pi*P*N*t)/60)$, and the second output sinusoidal signal 118 is defined as $\cos(\theta)*\sin(\omega*t)=\cos((2\pi*P*N*t)/60)$. As used herein, fc is the excitation frequency (e.g., $fc=\omega/2\pi$ hertz), P is the number of motor poles, N is the number of rotations of the motor per minute (e.g., RPM), and t is time (e.g., in seconds).

Figure 2A:
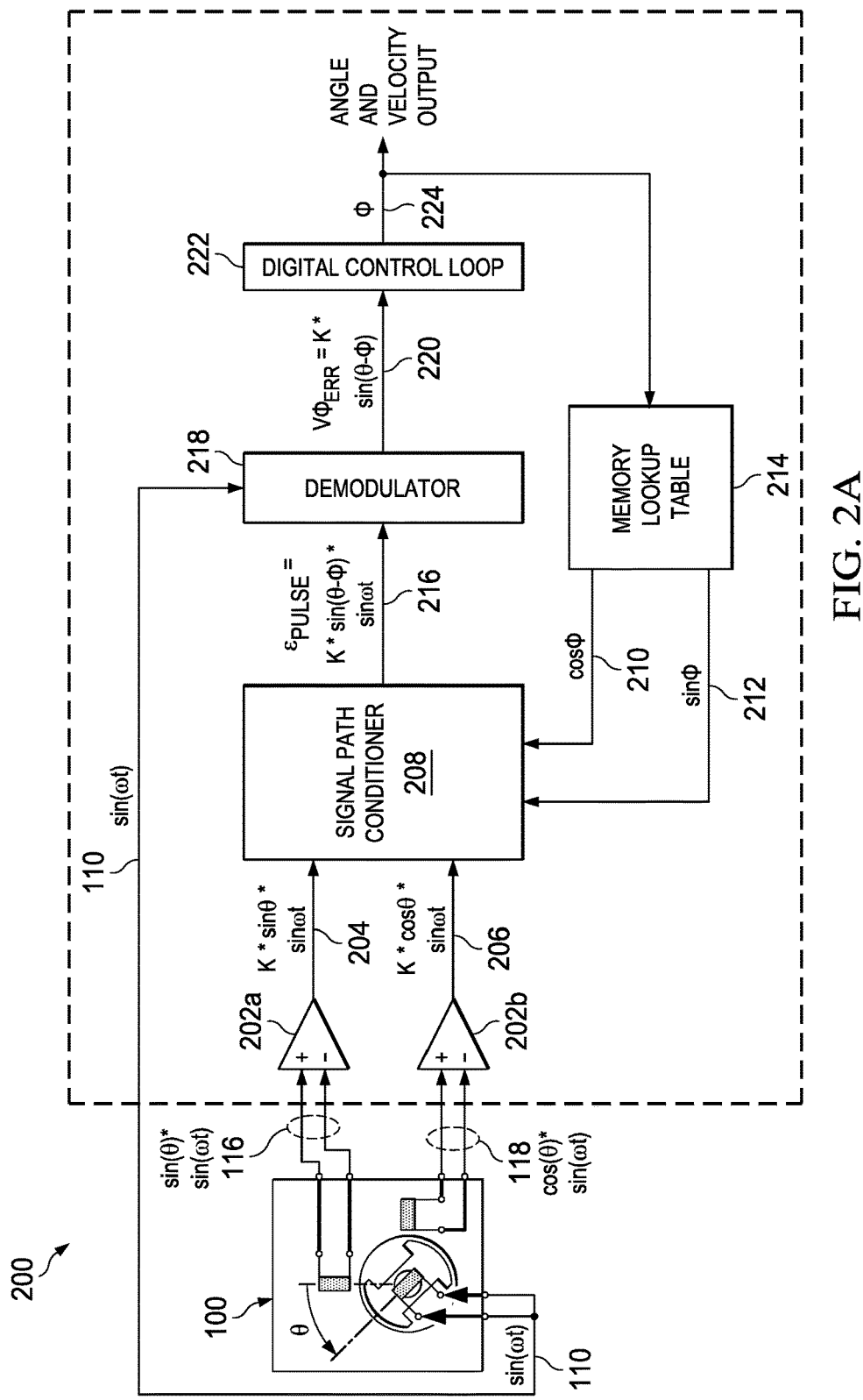
FIG. 2A is an illustration of an example resolver-to-digital converter with the sinusoidal signal outputs of the resolver sensor of FIG. 1A as inputs.
Figure 2B:
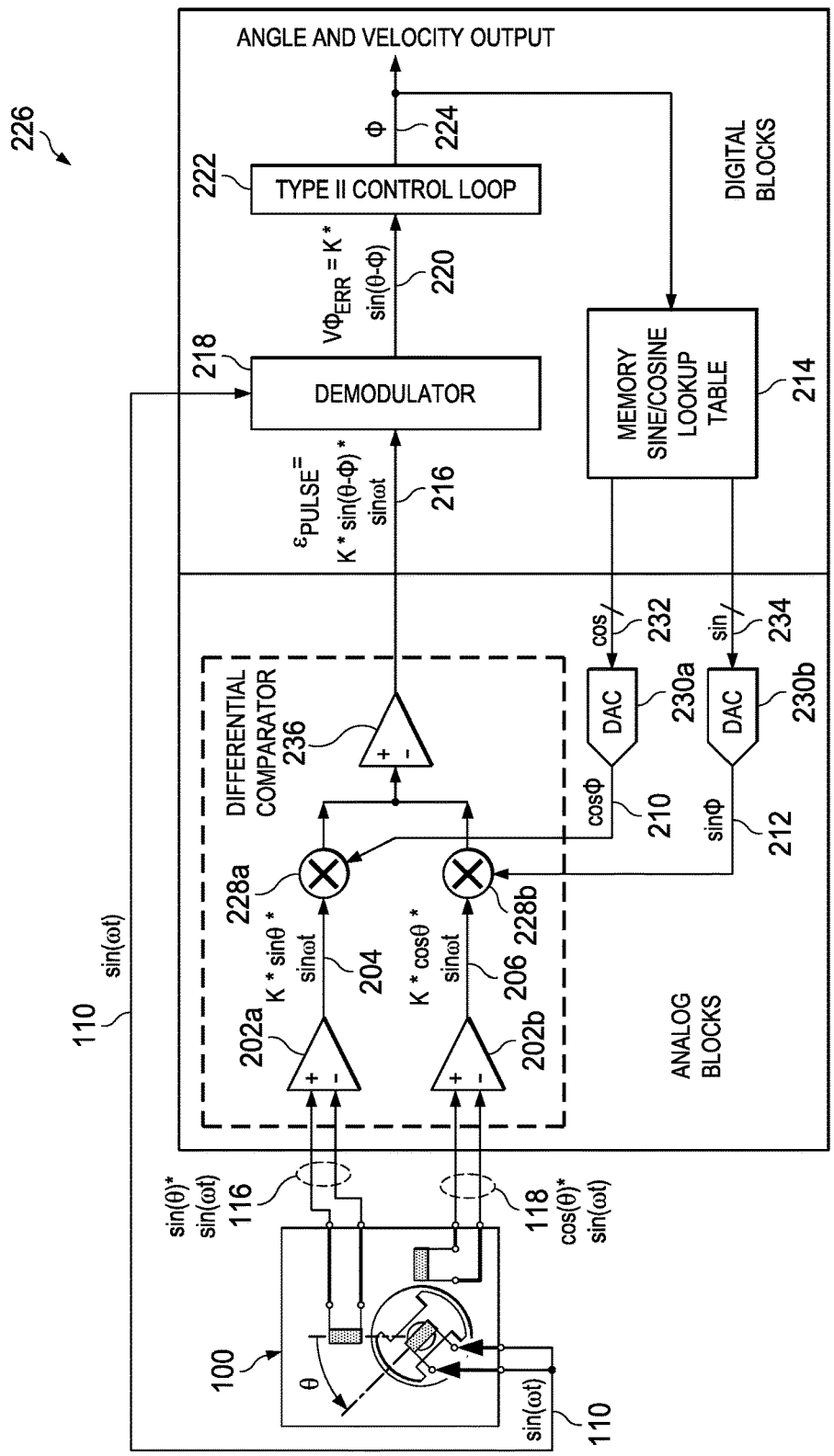
FIG. 2B is an illustration of an example implementation of the resolver-to-digital converter of FIG. 2A.

It is important to determine the rotor position angle 120 (e.g., θ) in many applications such as, for example, fully electric vehicle (EV) or industry robotic applications, which utilize resolvers for a variety of control systems that perform rotary/angular motion. To determine the rotor position angle 120 (e.g., θ), the example first output signal 116 and/or the example second output signal 118 are amplified, demodulated to remove the exciter sinusoidal signal, and processed to extract angle and velocity information. For example, the first output sinusoidal signal 116 and the second output sinusoidal signal 118 are applied as inputs to an example RDC loop 200, as illustrated in FIGS. 2A-2B. The RDC loop 200 attempts to determine the rotor position angle 120 (e.g., θ) by using an assumed angle (e.g. Φ) and iterating the RDC loop 200 until the rotor position angle 120 (e.g., θ) is determined. In some examples, the assumed angled (e.g., Φ) is arbitrarily selected (e.g., initial angle). In some examples, the assumed angled (e.g., Φ) is a previous output of the RDC loop 200.

In the illustrated example of FIG. 2A, the exciter sinusoidal signal 110 is applied to the example resolver sensor 100 to induce the first output sinusoidal signal 116 and the second output sinusoidal signal 118. The first output sinusoidal signal 116 is amplified by an amplifier 202a and the second output sinusoidal signal 118 is amplified by an amplifier 202b. For example, first output sinusoidal signal 116 (e.g., $\sin(\theta)*\sin(\omega*t)$) is amplified by K by the amplifier 202a. The output of the amplifier 202a is a first amplified sinusoidal signal 204 (e.g., $K*\sin(\theta)*\sin(\omega*t)$). The second output sinusoidal signal 118 (e.g., $\cos(\theta)*\sin(\omega*t)$) is amplified by K by the amplifier 202b. The output of the amplifier 202b is a second amplified sinusoidal signal 206 (e.g., $K*\cos(\theta)*\sin(\omega*t)$).

The output of the amplifier 202a and the output of the amplifier 202b are coupled to inputs of a signal path conditioner 208. The example signal path condition 208 additionally receives as inputs a first assumed sinusoidal signal 210 (e.g., $\cos(\Phi)$) and a second assumed sinusoidal signal 212 (e.g., $\sin(\Phi)$). In the illustrated example of FIG. 2A, the first assumed sinusoidal signal 210 and the second assumed sinusoidal signal 212 are output by a sinusoidal look-up table 214. In some examples, the sinusoidal look-up table 214 identifies the assumed angle (e.g., Φ) based on a predetermined value (e.g., 0) and/or based on a previous iteration of the RDC loop 200, and determines the sine and/or cosine of the assumed angle. In some examples, the sines and cosines of various angles are stored in the sinusoidal look-up table 214 instead of calculated based on an assumed angle. The example signal path condition 208 outputs a modulated signal 216 (e.g., $K*\sin(\theta-\Phi)*\sin(\omega*t)$) based on the first amplified sinusoidal signal 204, the second amplified sinusoidal signal 206, the first assumed sinusoidal signal 210, and the second assumed sinusoidal signal 212 using any number of conditioning techniques.

In the illustrated example of FIG. 2A, the modulated signal 216 and the exciter sinusoidal signal 110 are inputs to a demodulator 218. The demodulator 218 removes the exciter sinusoidal signal 110 from the modulated signal 216 to output a demodulated signal 220 (e.g., $K*\sin(\theta-\Phi)$), also referred herein as error voltage. The demodulated signal 220 is an input of a control loop 222. In some examples, the control loop 222 is a Type-II control loop with negative feedback. The goal of the negative feedback loop is to continuously drive the demodulated signal 220 (e.g., error voltage) very close to zero. The control loop 222 outputs an output angle 224 (e.g., Φ). In some examples, when the demodulated signal 220 (e.g., error voltage) approaches zero (e.g., $K*\sin(\theta-\Phi)\cong0$), the control loop 222 outputs the rotor position angle 120 (FIG. 1) (e.g., $\theta=\varphi$) or a phase-shifted version of the rotor position angle 120 (e.g., $\theta=\varphi+\pi$, $\theta=\varphi+2\pi$, etc.). For example, according to trigonometric identities, if $\sin(\theta-\varphi)\cong0$, then $\theta-\varphi\cong0$, π, 2π, . . . .

The output angle 224 of the control loop 222 is an input of the sinusoidal look-up table 214. In some examples, the output angle 224 becomes the assumed angle (e.g., Φ) for a subsequent iteration of the RDC loop 200. For example, the sinusoidal look-up table 214 outputs the cosine of the output angle 224 as the first assumed sinusoidal signal 210 and the sine of the output angle 224 as the second assumed sinusoidal signal 212. The first assumed sinusoidal signal 210 and the second assumed sinusoidal signal 212 are input to the signal path conditioner 208, thereby completing the RDC loop 200.

In operation, the RDC loop 200 tracks the rotor position angle 120 (e.g., θ) by producing the output angle 224 (e.g., Φ), which is fed into the sinusoidal look-up table 214 for subsequent comparison with the rotor position angle 120 (e.g., θ). The RDC loop 200 is iterated until the demodulated signal 220 or error voltage (e.g., $K*\sin(\theta-\Phi)$) approaches zero. When the demodulated signal 220 is approaching zero, the RDC loop 200 is locked and the output of the RDC loop 200 is associated with the rotor position angle 120 (e.g., $\theta=\Phi$, $\Phi+\pi$, $\Phi+2\pi$, etc.).

FIG. 2B illustrates an example implementation of the RDC loop 200 of FIG. 2A as an RDC loop 226. In the illustrated example of FIG. 2B, the exciter sinusoidal signal 110 is applied to the example resolver sensor 100 to induce the first output sinusoidal signal 116 and the second output sinusoidal signal 118. The first output sinusoidal signal 116 is amplified by an amplifier 202a and the second output sinusoidal signal 118 is amplified by an amplifier 202b. For example, first output sinusoidal signal 116 (e.g., $\sin(\theta)*\sin(\omega*t)$) is amplified by K by the amplifier 202a. The output of the amplifier 202a is a first amplified sinusoidal signal 204 (e.g., $K*\sin(\theta)*\sin(\omega*t)$). The second output sinusoidal signal 118 (e.g., $\cos(\theta)*\sin(\omega*t)$) is amplified by K by the amplifier 202b. The output of the amplifier 202b is a second amplified sinusoidal signal 206 (e.g., $K*\cos(\theta)*\sin(\omega*t)$). An example implementation of the signal path conditioner 208 of FIG. 2A includes a first multiplier 228a and a second multiplier 228b. The output of the amplifier 202a is coupled to an input of the first multiplier 228a and the output of the amplifier 202b is coupled to an input of the second multiplier 228b.

The first multiplier 228a additionally receives the first assumed sinusoidal signal 210 (e.g., $\cos(\Phi)$) as an input and the second multiplier 228b additionally receives the second assumed sinusoidal signal 212 (e.g., $\sin(\Phi)$) as an input. In connection with the above description, the RDC loop 226 uses assumed sinusoidal signals (e.g., sinusoids using assumed angles) in connection with the first and second output sinusoidal signals to determine the rotor position angle 120 (e.g., $\theta$). In the illustrated example of FIG. 2B, the first assumed sinusoidal signal 210 (e.g., $\cos(\Phi)$) is an analog signal converted by a first digital-to-analog converter 230a from a first digital assumed sinusoidal signal 23. The first digital-to-analog converter 230a converts the digital assumed sinusoidal signal 232 into the first assumed sinusoidal signal 210 (e.g., $\cos(\Phi)$) using any digital-to-analog conversion technique. In the illustrated example of FIG. 2B, the second assumed sinusoidal signal 212 (e.g., $\sin(\Phi)$) is an analog signal converted by a second digital-to-analog converter 230b from a second digital assumed sinusoidal signal 234. The second digital-to-analog converter 230b converts the second digital assumed sinusoidal signal 234 into the second assumed sinusoidal signal 212 (e.g., $\sin(\Phi)$) using any digital-to-analog conversion technique.

The first digital assumed sinusoidal signal 232 and the second digital assumed sinusoidal signal 234 are output by the sinusoidal look-up table 214. In some examples, the sinusoidal look-up table 214 identifies the assumed angle (e.g., $\Phi$) based on a predetermined value (e.g., $\theta$) and/or based on a previous iteration of the RDC loop 226, and determines the sine and/or cosine of the assumed angle. In some examples, the sines and cosines of various angles are stored in the sinusoidal look-up table 214 instead of calculated based on an assumed angle.

In some examples, the assumed sinusoidal signals are complementary sinusoids of the first and second output sinusoidal signals. For example, when the first output sinusoidal signal 116 is $\sin(\theta)*\sin(\omega*t)$, the first assumed sinusoidal signal 210 is $\cos(\Phi)$ (e.g., cosine is the complement of sine). Similarly, when the second output sinusoidal signal 116 is $\cos(\theta)*\sin(\omega*t)$, the second assumed sinusoidal signal 10 is $\sin(\Phi)$ (e.g., sine is the complement of cosine). The sinusoidal look-up table 214 produces the complementary sinusoids (e.g., $\cos(\Phi)$ and is $\sin(\Phi)$) for the first and second output sinusoidal signals to determine $\sin(\theta-\Phi)$. As shown in Equation 4, $\sin(\theta-\Phi)$ is determined by subtracting the product of $\cos(\theta)$ and $\sin(\Phi)$ from the product of $\sin(\theta)$ and $\cos(\Phi)$:

$$\sin(\theta-\Phi)=\sin(\theta)*\cos(\Phi)-\cos(\theta)*\sin(\Phi) \quad \text{Equation 4}$$

Therefore, the example first multiplier 228a outputs the product of the amplified sinusoidal signal 204 (e.g., $K*\sin(\theta)*\sin(\omega*t)$) with the first assumed sinusoidal signal 210 (e.g., $\cos(\Phi)$) to obtain $K*\sin(\theta)*\cos(\Phi)*\sin(\omega*t)$. The example second multiplier 228b outputs the product of the amplified second sinusoidal signal 206 (e.g., $K*\cos(\theta)*\sin(\omega*t)$) with the second assumed sinusoidal signal 212 (e.g., $\sin(\Phi)$) to obtain $K*\cos(\theta)*\sin(\Phi)*\sin(\omega*t)$. The outputs of the first and second multipliers 228a, 228b are coupled to inputs of a differential comparator 236. The differential comparator 236 outputs the difference between the output of the first multiplier 228a (e.g., $K*\sin(\theta)*\cos(\Phi)*\sin(\omega*t)$) and the output of the second multiplier 228b (e.g., $K*\cos(\theta)*\sin(\Phi)*\sin(\omega*t)$). Based on the trigonometric identity in Equation 4, the differential comparator 236 outputs the modulated signal 216 (e.g., $K*\sin(\theta-\Phi)*\sin(\omega*t)$).

In the illustrated example of FIG. 2B, the modulated signal 216 and the exciter sinusoidal signal 110 are inputs to a demodulator 218. The demodulator 218 removes the exciter sinusoidal signal 110 from the modulated signal 216 to output a demodulated signal 220 (e.g., $K*\sin(\theta-\Phi)$), also referred herein as error voltage. The demodulated signal 220 is an input of a control loop 222. In some examples, the control loop 222 is a Type-II control loop with negative feedback. The goal of the negative feedback loop is to continuously drive the demodulated signal 220 (e.g., error voltage) very close to zero. The control loop 222 outputs an output angle 224 (e.g., $\Phi$). In some examples, when the demodulated signal 220 (e.g., error voltage) approaches zero (e.g., $K*\sin(\theta-\Phi)\cong 0$), the control loop 222 outputs the rotor position angle 120 (FIG. 1) (e.g., $\theta=\varphi$) or a phase-shifted version of the rotor position angle 120 (e.g., $\theta=\varphi+\pi$, $\theta=\varphi+2\pi$, etc.), For example, according to trigonometric identities, if $\sin(\theta-\varphi)\cong 0$, then $\theta-\varphi\cong 0$, $\pi$, $2\pi$, ....

The output angle 224 of the control loop 222 is an input of the sinusoidal look-up table 214. In some examples, the output angle 224 becomes the assumed angle (e.g., $\Phi$) for a subsequent iteration of the RDC loop 226. For example, the sinusoidal look-up table 214 outputs the cosine of the output angle 224 as the first digital assumed sinusoidal signal 232 and the sine of the output angle 224 as the second digital assumed sinusoidal signal 234. The first digital-to-analog converter 230a converts the digital assumed sinusoidal signal 232 into the first assumed sinusoidal signal 210 and the second digital-to-analog converter 230b converts the second digital assumed sinusoidal signal 234 into the second assumed sinusoidal signal 212. The first assumed sinusoidal signal 210 is input to the first multiplier 228a for multiplication with the first amplified sinusoidal signal 204 and the second assumed sinusoidal signal 212 is input to the second multiplier 228b for multiplication with the second amplified sinusoidal signal 206.

In operation, the RDC loop 226 tracks the rotor position angle 120 (e.g., $\theta$) by producing the output angle 224 (e.g., $\Phi$), which is fed into the sinusoidal look-up table 214 for subsequent comparison with the rotor position angle 120 (e.g., $\theta$). The RDC loop 226 is iterated until the demodulated signal 220 or error voltage (e.g., $K*\sin(\theta-\Phi)$) approaches zero. When the demodulated signal 220 is approaching zero, the RDC loop 200 is locked and the output of the RDC loop 226 is associated with the rotor position angle 120 (e.g., $\theta=\Phi$, $\Phi+\pi$, $\Phi+2\pi$, etc.).

In some examples, a phase difference develops when the exciter sinusoidal signal 110 travels through the resolver sensor 100 windings which are highly inductive in nature (FIG. 1A) (e.g., when the exciter sinusoidal signal 110 is applied to the first winding 108 and is inductively coupled to the second winding 112 and the third winding 114). For example, the time it takes for the exciter sinusoidal signal 110 to travel through the first winding 108 and inductively couple to the third winding 114 causes a phase difference as shown in Equation 5:

$$\cos(\theta)*\sin(\omega*t+A) \qquad \text{Equation 5}$$

where "A" is the phase difference. For example, the phase difference is usually positive—meaning there is a phase lag but it is possible to have a phase lead as well.

In some examples, the phase difference is carried over into the modulated signal 216 (e.g., K*sin(θ−Φ)*sin(ω* t+A)) output by the differential comparator 222 of FIG. 2A and/or the signal path conditioner 234 of FIG. 2B. In some such examples, the modulated signal 216 is out of phase with the exciter sinusoidal signal 110 (e.g., sin(ω*t)) when input to the example demodulator 226. However, it is difficult to demodulate the modulated signal 216 with the exciter sinusoidal signal 110 if such a phase difference exists. As disclosed herein, example methods and apparatus determine the phase difference (e.g., A) between the modulated signal 216 output by the differential comparator 222 and the exciter sinusoidal signal 110 and adjust the example exciter sinusoidal signal 110 based on the determined phase difference. The adjusted exciter sinusoidal signal 110 is used to demodulate the modulated signal 216.

Figure 3:
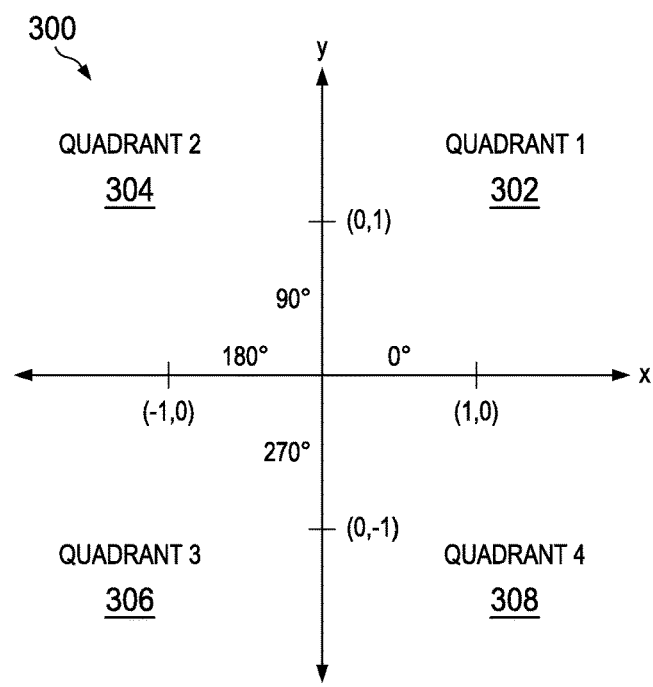
FIG. 3 is an illustration of Cartesian coordinates and example quadrants in which the sinusoidal signals of FIGS. 1A-1B may exist.

In some examples, determining the phase difference "A" between the modulated signal 216 and the exciter sinusoidal signal 110 depends on the quadrant of the modulated signal 216. In some examples, the signs of the first and second output sinusoidal signals 116, 118 can be used to identify the quadrant of the modulated signal 216 at a given time. Example methods and apparatus disclosed herein determine the quadrant to correctly identify the phase difference "A" between the modulated signal 216 and the exciter sinusoidal signal 110. FIG. 3 illustrates Cartesian coordinates 300 of an example quadrant I 302, an example quadrant II 304, an example quadrant III 306, and an example quadrant IV 308. Quadrant I 302 is associated with angles greater than 0 degrees and less than 90 degrees (e.g., π/2 radians), quadrant II 304 is associated with angles greater than 90 degrees and less than 180 degrees (e.g., π radians), quadrant III 306 is associated with angles greater than 180 degrees and less than 270 degrees (e.g., 3π/2 radians), and quadrant IV 308 is associated with angles greater than 270 degrees and less than 360 degrees (e.g., 2π).

Figure 4:
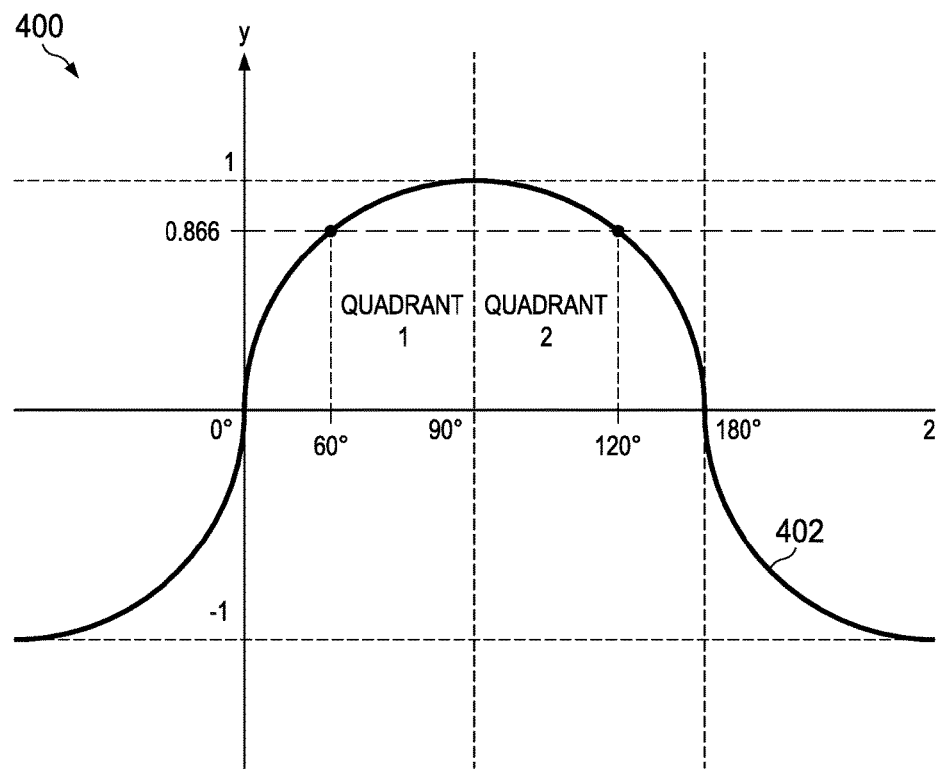
FIG. 4 is a graphical representation of a sine wave in association with the example quadrants of FIG. 3.

FIG. 4 is an example graph 400 of a portion of an example sine wave 402. As illustrated in FIG. 4, the value of sin(60°) (e.g., sin(π/3)=0.8666) is the same as the value of) sin(120°) (e.g., sin(2π/3)=0.8666), but the points represented by sin(60°) and sin(120°) lie in different quadrants (e.g., quadrant I 302 and quadrant II 304, respectively). Thus, when sin(ω*t+A)=0.8666, ω*t+A may equal π/3 radians (e.g. 60 degrees) or 2π/3 radians (e.g., 120 degrees). Similarly, the value of sin(0°) (e.g., sin(0)=0) is the same as the value of sin(180°) (e.g., sin(π)=0), but the points represented by sin(0°) and sin(180°) lie in different quadrants (e.g., quadrant I 302 and quadrant II 304, respectively). Knowing the quadrant is important in determining the phase difference "A" between the modulated signal 216 and the exciter sinusoidal signal 110.

As described above, the signs of the first and second output sinusoidal signals 116, 118 can be used to identify the quadrant of the modulated signal 216 at a given time. For example, as explained in Table 1, both sine and cosine are positive in quadrant I 402, sine is positive and cosine is negative in quadrant II 404, sine is negative and cosine is negative in quadrant III 406, and sine is negative and cosine is positive in quadrant IV 408.

TABLE 1

| Quadrant | Sign of Sine | Sign of Cosine |
|---|---|---|
| I | Positive | Positive |
| II | Positive | Negative |
| III | Negative | Negative |
| IV | Negative | Positive |

Therefore, if both the first output sinusoidal signal 116 and the second output sinusoidal signal 118 are positive, the modulated signal 216 in quadrant I 302 and is between 0 degrees and 90 degrees (e.g., 0 and n/2 radians). If the first output sinusoidal signal 116 is positive and the second output sinusoidal signal 118 is negative, the modulated signal 216 is in quadrant II 304 and is between 90 degrees and 180 degrees (e.g., n/2 and n radians). If the first output sinusoidal signal 116 is negative and the second output sinusoidal signal 118 is negative, the modulated signal 216 is in quadrant III 306 and is between 180 degrees and 270 degrees (e.g., n and 3n/2 radians). If the first output sinusoidal signal 116 is negative and the second output sinusoidal signal 118 is positive, the modulated signal 216 is in quadrant IV 308 and is between 270 degrees and 360 degrees (e.g., 3n/2 and 2n radians).

Near the edges of the quadrants (e.g., at π/2, π, 3π/2, 2π), sine or cosine waves approach the common-mode reference signal 122. As described above, the common-mode reference signal 122 is a (DC) voltage offset (e.g., a constant) from ground (e.g., 0 volts). In some examples, the common-mode reference signal 122 is ground and the sine and cosine waves approach ground near the edges of the quadrants (e.g., cos(π/2)=0, sin(π)=0, cos(3π/2)=0, sin(2π)=0). When sine and cosine waves approach the common-mode reference signal 122, noise and other interference can create signal variations because the amplitudes of such noise or other interference is greater than the relative amplitudes of the sine and cosine waves. For example, noise or other interference may cause the amplitudes of sine and cosine waves to fluctuate above and below the common-mode reference signal 122 (e.g., 0) during quadrant boundary transitions. Examples disclosed herein determine the phase difference "A" between the modulated signal 216 and the exciter sinusoidal signal 110 even where the first output sinusoidal signal 116 and the second output sinusoidal signal 118 approach the common-mode reference signal 122. Once the correct phase difference is determined, the exciter sinusoidal signal 110 can be adjusted and used to demodulate the modulated signal 216.

Figure 5A:
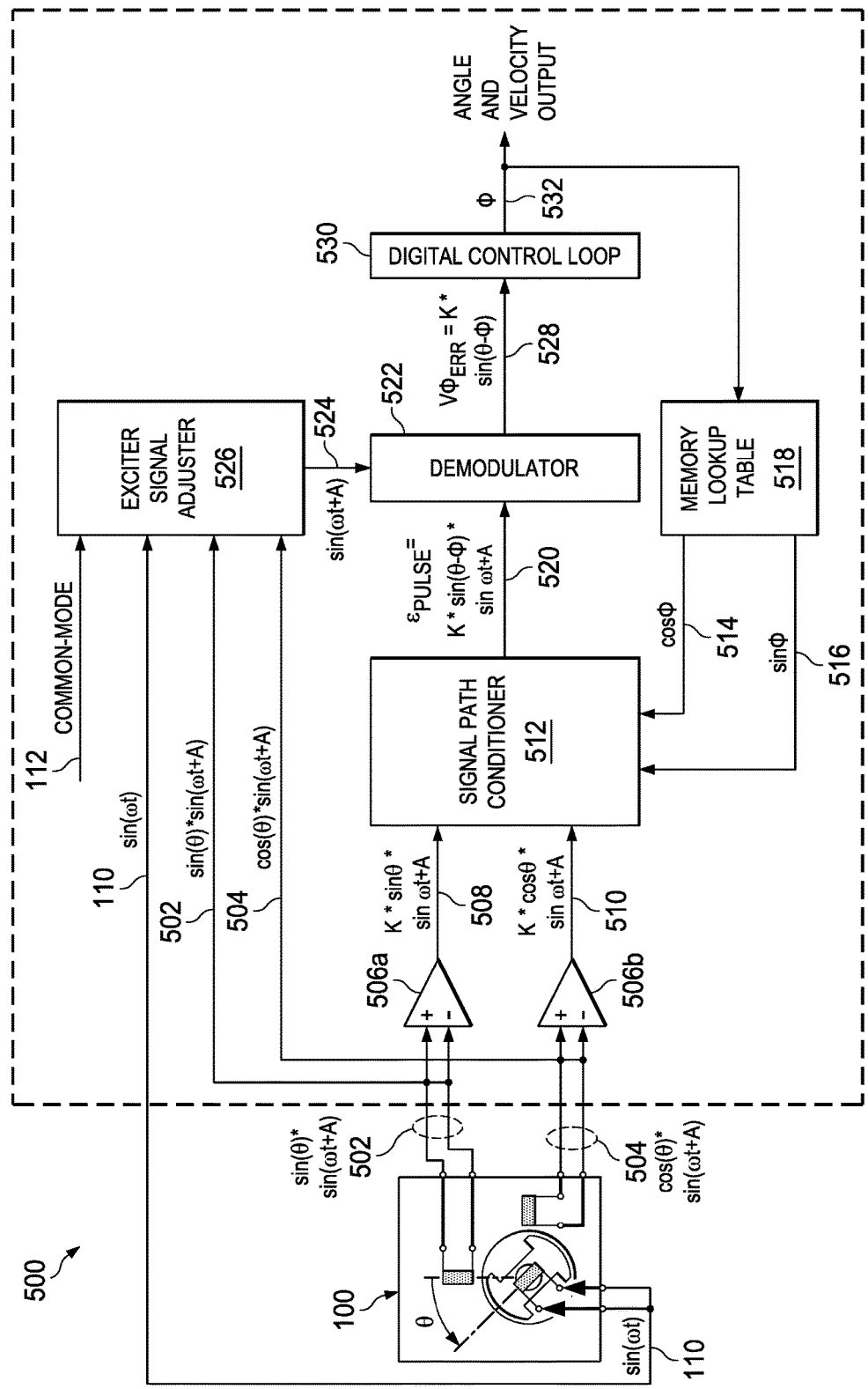
FIG. 5A is an illustration of an example resolver-to-digital converter with an example exciter signal adjuster.

FIG. 5A is a block diagram of an RDC loop 500 to determine the phase difference "A" between a modulated signal and an exciter signal. In the illustrated example of FIG. 5A, the exciter sinusoidal signal 110 is applied as an inducing sinusoidal signal to the example resolver sensor 100. As disclosed above, a phase difference occurs when the exciter sinusoidal signal 110 travels through the resolver sensor 100. A first phase-shifted sinusoidal signal 502 and a second phase-shifted sinusoidal signal 504 are output by the example resolver sensor 100 and input into the RDC loop 500. The first phase-shifted sinusoidal signal 502 is amplified by an amplifier 506a and the second phase-shifted sinusoidal signal 504 is amplified by an amplifier 506b. For example, first phase-shifted sinusoidal signal 502 (e.g., sin(θ)*sin(ω*t+A)) is amplified by K by the amplifier 506a.

The output of the amplifier 506a is a first amplified sinusoidal signal 508 (e.g., K*sin(θ)*sin(ω*t+A)). The second phase-shifted sinusoidal signal 504 (e.g., cos(θ)*sin(ω*t)+A) is amplified by K by the amplifier 506b. The output of the amplifier 506b is a second amplified sinusoidal signal 510 (e.g., K*cos(θ)*sin(ω*t+A)). The output of the amplifier 506a and the output of the amplifier 506b are coupled to inputs of a signal path conditioner 512. The example signal path conditioner 512 additionally receives as inputs a first assumed sinusoidal signal 514 (e.g., cos(Φ)) and a second assumed sinusoidal signal 516 (e.g., sin(Φ)). The first assumed sinusoidal signal 514 and the second assumed sinusoidal signal 516 are output by a sinusoidal look-up table 518. The example signal path conditioner 512 outputs a modulated signal 520 (e.g., K*sin(θ*sin(θ−Φ)*sin(ω*t+A)) based on the first phase-shifted sinusoidal signal 502, the second phase-shifted sinusoidal signal 504, the first assumed sinusoidal signal 514, and the second assumed sinusoidal signal 516 using any number of conditioning techniques.

In the example of FIG. 5A, the modulated signal 520 is an input to a demodulator 522. In contrast to the demodulator 218 of FIGS. 2A-2B, the demodulator 522 of FIGS. 5A-5B has an adjusted exciter sinusoidal signal 524 (e.g., including the phase difference "A") as an input, rather than the exciter sinusoidal signal 110. As described above, it is difficult to demodulate a phase shifted modulated signal with the exciter sinusoidal signal 110. Accordingly, an exciter signal adjuster 526 adjusts the exciter sinusoidal signal 110 (e.g., sin(ω*t)) to create the adjusted exciter sinusoidal signal 524 (e.g., sin(ω*t+A)). To determine the phase difference "A" between the exciter sinusoidal signal 110 and the modulated signal 520, the exciter signal adjuster 526 measures one or more phase differences between the exciter sinusoidal signal 110 and the first and second phase-shifted sinusoidal signals 502, 504. Additionally, the exciter signal adjuster 526 uses the sign of the first and second phase-shifted sinusoidal signals 502, 504 in combination with the one or more phase differences to determine the phase difference "A" between the exciter sinusoidal signal 110 the modulated signal 520.

In the illustrated example of FIG. 5A, the exciter signal adjuster 526 receives the exciter sinusoidal signal 110, the common-mode reference signal 122, the first phase-shifted sinusoidal signal 502, and the second phase-shifted sinusoidal signal 504 as inputs and outputs the adjusted exciter sinusoidal signal 524 to the demodulator 522. The demodulator 522 removes the adjusted exciter sinusoidal signal 524 from the modulated signal 520 to output a demodulated signal 528 (e.g., K*sin(θ−Φ)) also referred to herein as the error voltage. The demodulated signal 528 is an input of a control loop 530. The control loop 530 outputs an output angle 532 (e.g., Φ), as similarly described in connection with the example RDC loop 200 of FIG. 2A and the RDC loop 226 of FIG. 29.

Figure 5B:
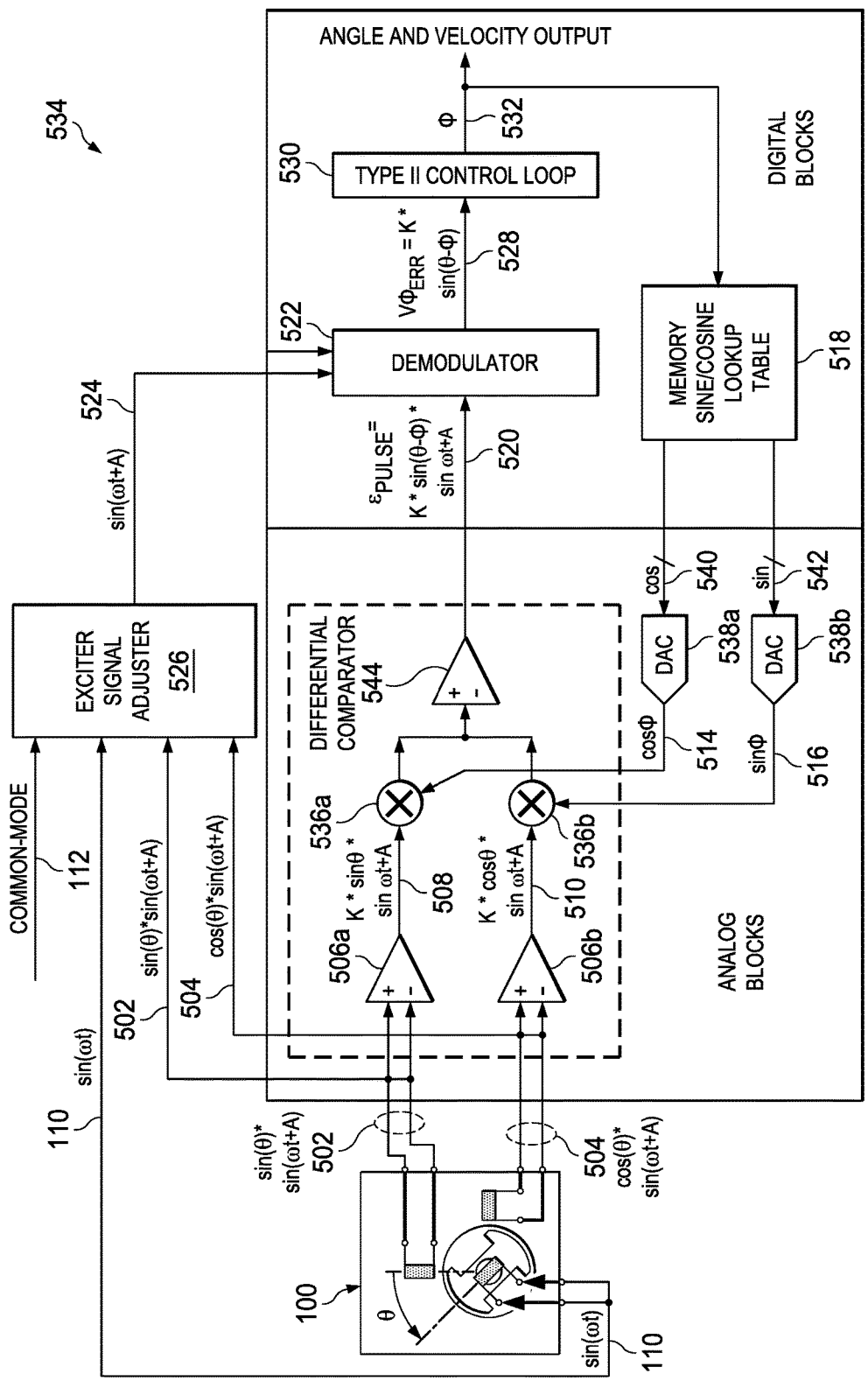
FIG. 5B is an illustration of an example implementation of the resolver-to-digital converter of FIG. 5A.

FIG. 5B illustrates an example implementation of the RDC loop 500 of FIG. 5A as an RDC loop 534. In the illustrated example of FIG. 5B, the exciter sinusoidal signal 110 is applied as an inducing sinusoidal signal to the example resolver sensor 100. As disclosed above, a phase difference occurs when the exciter sinusoidal signal 110 travels through the resolver sensor 100. A first phase-shifted sinusoidal signal 502 and a second phase-shifted sinusoidal signal 504 are output by the example resolver sensor 100 and input into the RDC loop 534. The first phase-shifted sinusoidal signal 502 is amplified by an amplifier 506a and the second phase-shifted sinusoidal signal 504 is amplified by an amplifier 506b. For example, first phase-shifted sinusoidal signal 502 (e.g., sin(θ)*sin(ω*t+A)) is amplified by K by the amplifier 506a. The output of the amplifier 506a is the first amplified sinusoidal signal 508 (e.g., K*sin(θ)*sin(ω*t+A)). The second phase-shifted sinusoidal signal 504 (e.g., cos(θ)*sin(ω*t)+A) is amplified by K by the amplifier 506b. The output of the amplifier 506b is the second amplified sinusoidal signal 510 (e.g., K*cos(θ)*sin(ω*t+A)). An example implementation of the signal path conditioner 512 of FIG. 5A includes a first multiplier 536a and a second multiplier 536b. The output of the amplifier 506a is coupled to an input of a first multiplier 536a and the output of the amplifier 506b is coupled to an input of a second multiplier 536b.

The first multiplier 536a additionally receives the first assumed sinusoidal signal 514 (e.g., cos(Φ)) as an input and the second multiplier 536b additionally receives the second assumed sinusoidal signal 516 (e.g., sin(Φ)) as an input. In the illustrated example of FIG. 5B, the first assumed sinusoidal signal 514 (e.g., cos(Φ)) is an analog signal converted by a first digital-to-analog converter 538a from a first digital assumed sinusoidal signal 540. The first digital-to-analog converter 538a converts the digital assumed sinusoidal signal 540 into the first assumed sinusoidal signal 514 (e.g., cos(Φ)) using any digital-to-analog conversion techniques. In some examples, the second assumed sinusoidal signal 516 (e.g., sin(ω)) is an analog signal converted by a second digital-to-analog converter 538b from a second digital assumed sinusoidal signal 542. The second digital-to-analog converter 538b converts the second digital assumed sinusoidal signal 542 into the second assumed sinusoidal signal 516 (e.g., sin(Φ)) using any digital-to-analog conversion techniques. The first digital assumed sinusoidal 540 and the second digital assumed sinusoidal signal 542 are output by the sinusoidal look-up table 518.

The example first multiplier 536a outputs the product of the amplified sinusoidal signal 508 (e.g., K*sin(θ)*sin(ω*t+A)) with the first assumed sinusoidal signal 514 (e.g., cos(Φ)) to obtain K*sin(θ)*cos(Φ)*sin(ω*t+A). The example second multiplier 536b outputs the product of the amplified second sinusoidal signal 510 (e.g., K*cos(θ)*sin(ω*t+A)) with the second assumed sinusoidal signal 516 (e.g., sin(Φ)) to obtain K*cos(ω)*sin(Φ)*sin(ω*t+A). The outputs of the first and second multipliers 536a, 536b are coupled to inputs of a differential comparator 544. The differential comparator 544 outputs the difference between the output of the first multiplier 536a (e.g., K*sin(θ)*cos(Φ)*sin(ω*t+A)) and the output of the second multiplier 536b (e.g., K*cos(θ)*sin(Φ)*sin(ω*t+A)). Based on the trigonometric identity in Equation 4, the differential comparator 544 outputs a modulated signal 520 (e.g., K*sin(θ−Φ)*sin(ω*t+A)).

In the illustrated example of FIG. 5B, the modulated signal 520 is an input to a demodulator 522. In contrast to the demodulator 226 of FIG. 2, the demodulator 522 of FIG. 5 has an adjusted exciter sinusoidal signal 524 (e.g., including the phase difference "A") as an input rather than the exciter sinusoidal signal 110. As described above, it is difficult to demodulate a phase shifted modulated signal with the exciter sinusoidal signal 110. Accordingly, an exciter signal adjuster 526 adjusts the exciter sinusoidal signal 110 (e.g., sin(ω*t)) to create the adjusted exciter sinusoidal signal 524 (e.g., sin(ω*t+A)). To determine the phase difference "A" between the exciter sinusoidal signal 110 and the modulated signal 520, the exciter signal adjuster 526 measures one or more phase differences between the exciter sinusoidal signal 110 and the first and second phase-shifted sinusoidal signals 502, 504. Additionally, the exciter signal adjuster 526 uses the sign of the first and second phase-shifted sinusoidal signals 502, 504 in combination with the one or more phase differences to determine the phase difference "A" between the exciter sinusoidal signal 110 the modulated signal 520.

In the illustrated example of FIG. 5B, the exciter signal adjuster 526 receives the exciter sinusoidal signal 110, the common-mode reference signal 122, the first phase-shifted sinusoidal signal 502, and the second phase-shifted sinusoidal signal 504 as inputs and outputs the adjusted exciter sinusoidal signal 524 to the demodulator 522. The demodulator 522 removes the adjusted exciter sinusoidal signal 524 from the modulated signal 520 to output a demodulated signal 528 (e.g., $K*\sin(\theta-\Phi)$). The demodulated signal 528 is an input of the control loop 530. The control loop 530 outputs the output angle 532 (e.g., $\Phi$), as similarly described in connection with the example RDC loop 200 of FIG. 2A, the example RDC loop 226, and/or the example RDC loop 500.

There are similarities between the example RDC loop 500 of FIG. 5A and/or the example RDC loop 542 of FIG. 5B and the example RDC loop 200 of FIG. 2A and/or the example RDC loop 234 of FIG. 2B. In the interest of brevity, similar structures will not be re-described here. Instead, the interested reader is referred to the above discussion of FIGS. 2A-2B for a full and enabling discussion of the structures.

Figure 6:
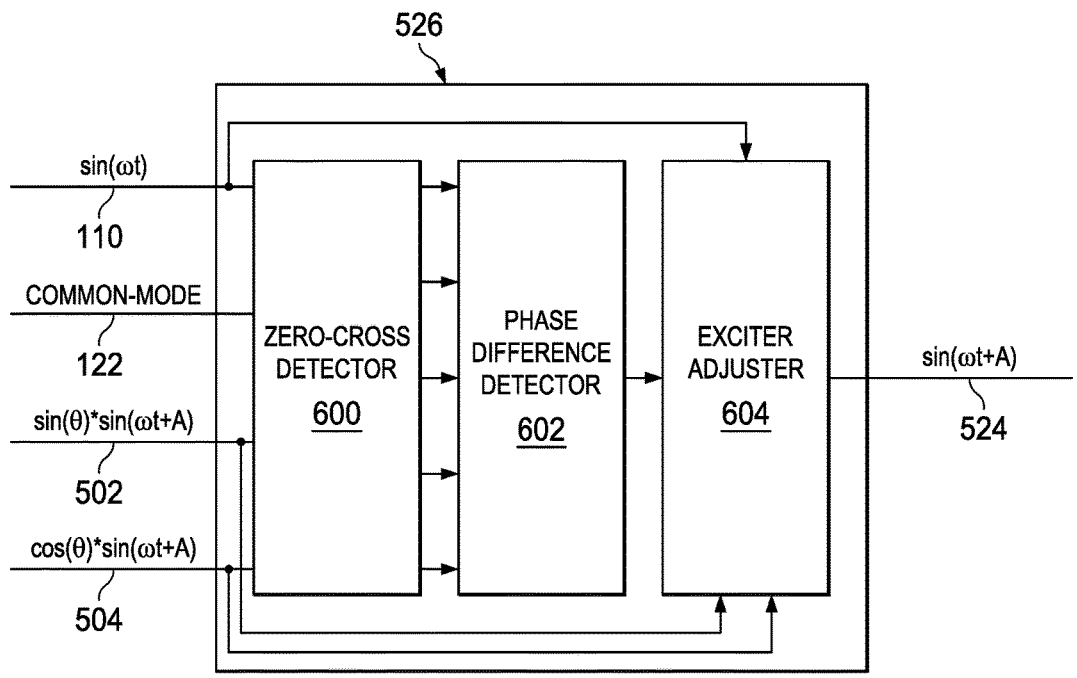
FIG. 6 is a block diagram of the example exciter signal adjuster of FIG. 5.

FIG. 6 is an illustration of an example implementation of the exciter signal adjuster 526 of FIGS. 5A-5B. The exciter signal adjuster 526 of FIG. 6 includes a zero-cross detector 600, a phase difference detector 602, and an exciter adjuster 604. In some examples, the exciter signal adjuster 526 of FIG. 6 is implemented using hardware. For example, the zero-cross detector 600, the example phase difference detector 602, and/or the example exciter adjuster may include one or more comparators, multiplexors, or other logic circuits. In some examples, the exciter signal adjuster 526 of FIG. 6 is implemented using computer readable instructions executed by a computing device, such as, for example, a processor platform 1500 of FIG. 15.

The example zero-cross detector 600 receives the exciter sinusoidal signal 110, the common-mode reference signal 122, the first phase-shifted sinusoidal signal 502, and the second phase-shifted sinusoidal signal 504 as inputs and outputs one or more zero-cross signals, as further described in connection with FIGS. 7 and/or 9. Based on the zero-cross signals, the example phase difference detector 602 determines one or more phase differences between the exciter sinusoidal signal 110 and the first and second phase-shifted sinusoidal signals 502, 504 and outputs a phase difference between the modulated signal 520 and the exciter sinusoidal signal 110. The example exciter adjuster 604 receives the exciter sinusoidal signal 110, the phase difference "A" between the modulated signal 520 and the exciter sinusoidal signal 110, the first phase-shifted sinusoidal signal 502, and the second phase-shifted sinusoidal signal 504 as inputs. The example exciter adjuster 604 determines the quadrant of the phase difference "A" between the modulated signal 520 and the exciter sinusoidal signal 110 based on the signs of the zero-cross detector 600 which uses the first phase-shifted sinusoidal signal 502 (e.g., based on Table 1), and the second phase-shifted sinusoidal signal 504. The example exciter adjuster 604 adjusts the exciter sinusoidal signal 110 fed to the demodulator 522 based on (1) the phase difference "A" between the modulated signal 520 and the exciter sinusoidal signal 110, and (2) the quadrant of the phase difference to output the adjusted exciter sinusoidal signal 524.

Figure 7A:
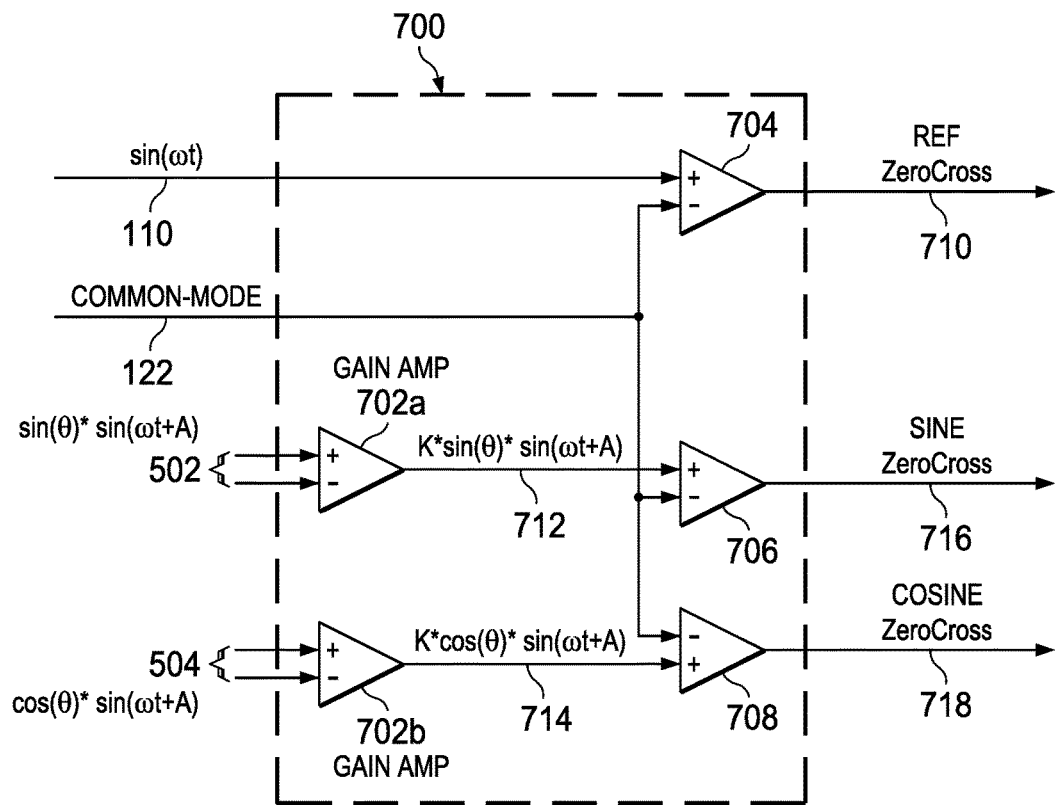
FIG. 7A is an illustration of an example implementation of a zero-cross detector of FIG. 6 to determine zero-crosses of the sinusoidal signals of FIG. 5.

FIG. 7A is an illustration of an example zero-cross detector 700. In some examples, the zero-cross detector 700 is an example implementation of the zero-cross detector 600 (FIG. 6). As disclosed herein, a zero-cross is a point in which a sinusoidal signal crosses a longitudinal axis (e.g., the common-mode reference signal 122). The example zero-cross detector 700 determines zero-crosses in the example exciter sinusoidal signal 110, the first phase-shifted sinusoidal signal 502, and the example second phase-shifted sinusoidal signal 504 for the determination of phase differences between the example exciter sinusoidal signal 110 and the example first phase-shifted sinusoidal signal 502, and between the example exciter sinusoidal signal 110 and the example second phase-shifted sinusoidal signal 504. The example zero-cross detector 700 operates on the example exciter sinusoidal signal 110, the common-mode reference signal 122, the example first phase-shifted sinusoidal signal 502, and the example second phase-shifted sinusoidal signal 504; all of which are received as inputs. In some examples, the common-mode reference signal 122 is zero. In some examples, the common-mode reference signal 122 is a different constant DC offset voltage. The example zero-cross detector 700 of FIG. 7A includes an example first amplifier 702a, am example second amplifier 702b, an example first comparator 704, an example second comparator 706, and an example third comparator 708.

The example first comparator 704 determines zero-crosses for the example exciter sinusoidal signal 110. The first comparator 704 compares the example exciter sinusoidal signal 110 and the common-mode reference signal 122, which it receives as inputs, and outputs a reference zero-cross signal 710. In some examples, the first comparator 704 may not be included in the example zero-cross detector 700 of FIG. 7. In such examples, the reference zero-cross signal 710 can be determined by the IC that generates the example sinusoidal signal 110.

In some examples, the exciter zero-cross signal 710 is a high value (e.g., a digital one or "true") when the example exciter sinusoidal signal 110 exceeds the common-mode reference signal 122, and the exciter zero-cross signal 710 is a tow value (e.g., a digital zero or "false") when the example exciter sinusoidal signal 110 does not exceed the common-mode reference signal 122. In some examples, the exciter zero-cross signal 710 is a low value (e.g., a digital zero or "false") when the example exciter sinusoidal signal 110 exceeds the common-mode reference signal 122, and the exciter zero-cross signal 710 is a high value (e.g., digital one or "true") when the example exciter sinusoidal signal 110 does not exceed the common-mode reference signal 122. The example first comparator 704 identities a zero-cross in the example exciter sinusoidal signal 110 when the exciter zero-cross signal 710 transitions from a value representing the exciter signal 110 being above the common-mode reference signal 122 to a value representing the exciter signal 110 being below the common-mode reference signal 122 or when the exciter zero-cross signal 710 transitions from a value representing the exciter signal 110 being below the common-mode reference signal 122 to a value representing the exciter signal 110 being above the common-mode reference signal 122.

The example first amplifier 702a amplifies the first phase-shifted sinusoidal signal 502 and the example second amplifier 702b amplifies the second phase-shifted sinusoidal signal 504. For example, the first phase-shifted sinusoidal signal 502 (e.g., $\sin(\theta)*\sin(\omega*t+A)$) is input into the first amplifier 702a, which outputs an amplified first output sinusoidal signal 712 (e.g., $K*\sin(\theta)(\omega*t+A)$). The example second phase-shifted sinusoidal signal 504 (e.g., $\cos(\theta)*\sin(\omega*t+A)$) is input into the second amplifier 702b, which outputs an amplified second output sinusoidal signal 714 (e.g., K*cos(θ)*sin(ω*+A)). In some examples, the first amplifier 702a and the second amplifier 702b are implemented via one or more operational amplifiers (e.g., op-amps).

The example second comparator 706 determines zero-crosses for the example amplified first output sinusoidal signal 712. The second comparator 706 compares the example amplified first output sinusoidal signal 712 and the common-mode reference signal 122, which it receives as inputs, and outputs a first output sinusoidal zero-cross signal 716. In some examples, the first output sinusoidal zero-cross signal 716 is a high value (e.g., digital one or "true") when the example amplified first output sinusoidal signal 712 exceeds the common-mode reference signal 122, and the first output sinusoidal zero-cross signal 716 is a low value (e.g., digital zero or "false") when the example amplified first output sinusoidal signal 712 does not exceed the common-mode reference signal 122. In some examples, the first output sinusoidal zero-cross signal 716 is a low value digital zero or "false") when the example amplified first output sinusoidal signal 712 exceeds the common-mode reference signal 122, and the first output sinusoidal zero-cross signal 716 is a high value (e.g., digital one or "true") when the example amplified first output sinusoidal signal 712 does not exceed the common-mode reference signal 122.

The example second comparator 706 identifies a zero-cross in the example amplified first output sinusoidal signal 712 when the first output sinusoidal zero-cross signal 716 transitions from a value representing the example amplified first output sinusoidal signal 712 being above the common-mode reference signal 122 to a value representing the example amplified first output sinusoidal signal 712 being below the common-mode reference signal 122 or when first output sinusoidal zero-cross signal 716 transitions from a value representing the example amplified first output sinusoidal signal 712 being below the common-mode reference signal 122 to a value representing the example amplified first output sinusoidal signal 712 being above the common-mode reference signal 122.

The example third comparator 708 determines zero-crosses for the example amplified second output sinusoidal signal 714. The third comparator 708 compares the example amplified second output sinusoidal signal 714 and the common-mode reference signal 122, which it receives as inputs, and outputs a second output sinusoidal zero-cross signal 718. In some examples, the second output sinusoidal zero-cross signal 718 is a high value when the example amplified second output sinusoidal signal 714 exceeds the common-mode reference signal 122, and the second output sinusoidal zero-cross signal 718 is a low value when the example amplified second output sinusoidal signal 714 does not exceed the common-mode reference signal 122. In some examples, the second output sinusoidal zero-cross signal 718 is a low value when the example amplified second output sinusoidal signal 714 exceeds the common-mode reference signal 122, and the second output sinusoidal zero-cross signal 718 is a high value when the example amplified second output sinusoidal signal 714 does not exceed the common-mode reference signal 122.

The example third comparator 708 identifies a zero-cross in the example amplified second output sinusoidal signal 714 when the second output sinusoidal zero-cross signal 718 transitions from a value representing the example amplified second output sinusoidal signal 714 being above the common-mode reference signal 122 to a value representing the example amplified second output sinusoidal signal 714 being below the common-mode reference signal 122 or when the second output sinusoidal zero-cross signal 718 transitions from a value representing the example amplified second output sinusoidal signal 714 being below the common-mode reference signal 122 to a value representing the example amplified second output sinusoidal signal 714 being above the common-mode reference signal 122.

In some examples, the exciter zero-cross signal 710, the first output sinusoidal zero-cross signal 716, and the second output sinusoidal zero-cross signal 718 are inputs to an example phase difference detector 720, as further described in connection with in FIG. 7B. The example phase difference detector 720 of FIG. 7B includes an example first sinusoidal phase difference measurer 722, an example second sinusoidal phase difference measurer 724, and an example phase difference selector 726. In some examples, the example first sinusoidal phase difference measurer 722 measures a first time elapsed between a first zero-cross identified by the exciter zero-cross signal 710 and a second zero-cross identified by the first output sinusoidal zero-cross signal 716. In some examples, the second sinusoidal phase difference measurer 724 measures a second time elapsed between the first zero-cross identified by the exciter zero-cross signal 710 and a third zero-cross identified by the second output sinusoidal zero-cross signal 718.

The first and second elapsed times correspond to phase differences (1) between the example exciter sinusoidal signal 110 and the respective example amplified first output sinusoidal signal 712 and (2) between the example exciter sinusoidal signal 110 and the example amplified second output sinusoidal signal 714, respectively. In some examples, the example phase difference selector 726 determines that the lower of the two phase differences (e.g., min (first elapsed time, second elapsed time)) is the phase difference "A" between the modulated signal 520 (e.g., output by the signal path conditioner 512 of FIG. 5A or output by the differential comparator 544 of FIG. 5B) and the exciter sinusoidal signal 110. In some examples, the example phase difference selector 726 determines that the higher of the two phase differences e.g., max (first elapsed time, second elapsed time)) is the phase difference "A" between the modulated signal 520 output by the differential comparator 512 and the exciter sinusoidal signal 110.

Figure 7B:
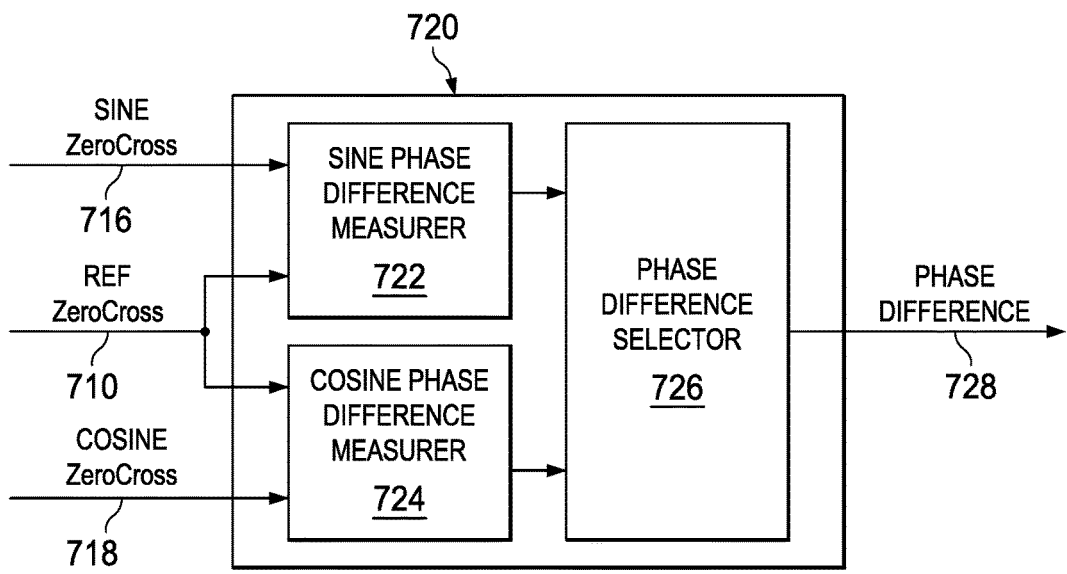
FIG. 7B is an illustration of an example implementation of a phase difference detector of FIG. 6 to determine a phase difference of the sinusoidal signals of FIG. 5.

The example zero-cross detector 700 of FIG. 7A and the example phase difference detector 720 of FIG. 7B provide accurate zero-crosses and an accurate phase difference when the example amplified first output sinusoidal signal 712 and the example amplified second output sinusoidal signal 714 are relatively larger than the common-mode reference signal 122. However, when the example amplified first output sinusoidal signal 712 and/or the example amplified second output sinusoidal signal 714 are relatively close to the common-mode reference signal 122, temperature variations, systematic offsets, offset drifts, noise, of other interfering factors can cause the outputs of the second comparator 706 and/or the third comparator 708 to output a false positive zero-crossing, as further shown in FIG. 8.

Figure 8:
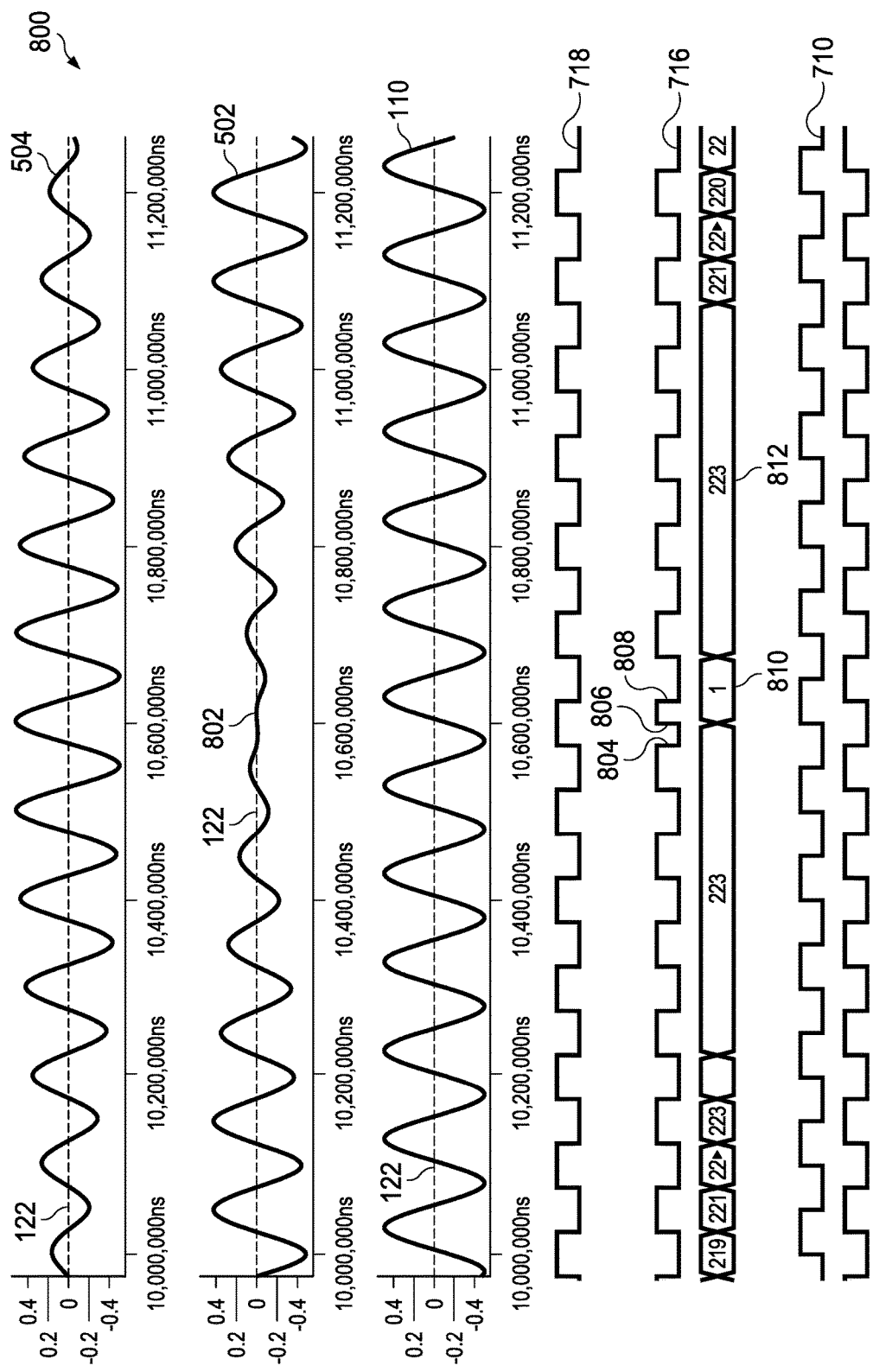
FIG. 8 is a graphical representation of the input and output signals of the example zero-cross detector of FIG. 7A.

FIG. 8 is an example graphical representation 800 of the first phase-shifted sinusoidal signal 502, the second phase-shifted sinusoidal signal 504, the exciter sinusoidal signal 110, the first output sinusoidal zero-cross signal 716 (e.g., the output of the second comparator 706), the second output sinusoidal zero-cross signal 718, and the exciter zero-cross signal 710 (e.g., the inputs and outputs of the example zero-cross detector 700). As illustrated in FIG. 8, the first phase-shifted sinusoidal signal 502 approaches the common-mode reference signal 122 (e.g., zero) at a first time

802. When the first phase-shifted sinusoidal signal 502 approaches the common-mode reference signal 122, example comparator 706 (FIG. 7) determines a false positive zero-crossing. The probability of false positive or false negative zero crossings are high when noise and other interferences are present. For example, if the amplitude of the first phase-shifted sinusoidal signal 502 is −0.01 and the amplitude of the common-mode reference signal 122 is 0.00, noise or other interference can cause the amplitude of the first phase-shifted sinusoidal signal 502 to become 0.01 (e.g., a 0.02 variation), which would cause the second comparator 706 to indicate a zero-crossing.

In the illustrated in FIG. 8, at the first time 802, the amplitude of the first phase-shifted sinusoidal signal 502 is very close to signal level of the common-mode reference signal 122 and the second comparator 706 makes an incorrect decision at time 806. Such signal variations around the common-mode reference signal 122 cause the second comparator 706 to incorrectly identify a zero-crossing. This is further aggravated with multiple zero-crossings when noise and other interferences are present in the system at this period. For example, when the amplitude of the first phase-shifted sinusoidal signal 502 initially goes below the common-mode reference signal 122, the second comparator 706 outputs a low value (e.g., 0) at a second time 804. However, at a third time 806, the second comparator 706 outputs a high value (e.g., 1), signifying that the amplitude of the first phase-shifted sinusoidal signal 502 is above the common-mode reference signal 122. Then, at a fourth time 808, the second comparator 706 again outputs a low value (e.g., 0), signifying that the amplitude of the first phase-shifted sinusoidal signal 502 is below the common-mode reference signal 122. The second comparator 706 incorrectly indicates that a zero-cross occurs at the third time 806.

Based on the incorrect zero-cross at the third time 806, a calculated phase difference 810 (e.g., the phase difference 728 based on the incorrect zero-cross) between the example exciter sinusoidal signal 110 and the example first phase-shifted sinusoidal signal 502 is relatively small (e.g., 1). In comparison, when the first phase-shifted sinusoidal signal 502 is much greater than or much less than the common-mode reference signal 122, a calculated phase difference 812 (e.g., the phase difference 728 based on a correct zero-cross) is relatively large (e.g., 223). Because the phase difference 810 between the example exciter sinusoidal signal 110 and the example first phase-shifted sinusoidal signal 502 is based on the incorrect zero-crossing, it should not be used to determine the phase difference "A" between the modulated signal 520 and the exciter sinusoidal signal 110.

Figure 9:
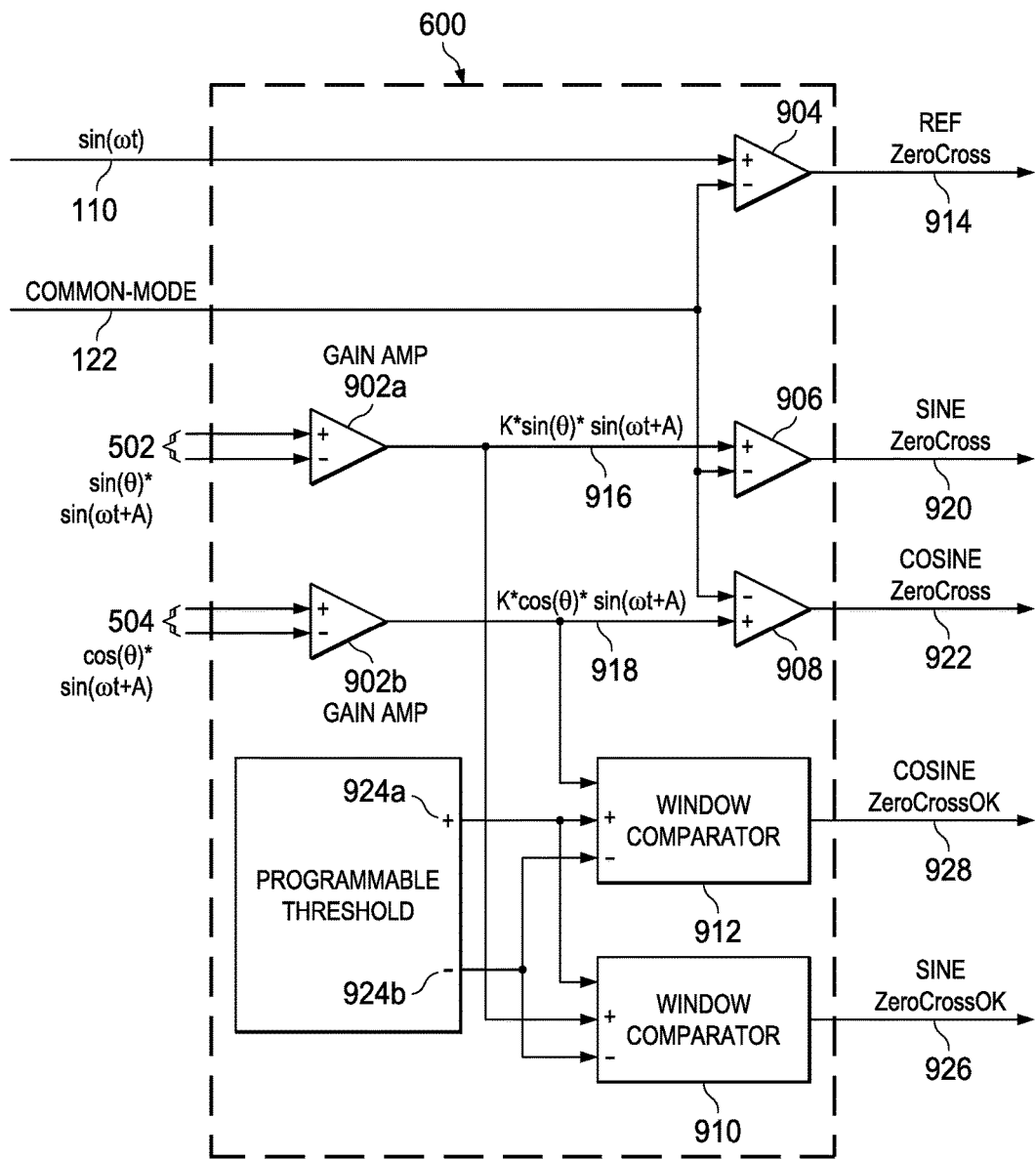
FIG. 9 is an illustration of an example implementation of the zero-cross detector of FIG. 6 to determine zero-crosses of the sinusoidal signals of FIG. 5 and to determine whether to use the determined zero-crosses in determining phase differences.

Example methods and apparatus disclosed herein avoid identifying incorrect zero-crosses due to signal variations around the common-mode reference signal 122 such that the phase difference "A" between the modulated signal 520 and the exciter sinusoidal signal 110 is more accurate. FIG. 9 illustrates an example implementation of the zero-cross detector 600 of FIG. 6 constructed in accordance with the teachings of this disclosure. The example zero-cross detector 600 determines zero-crosses in the example exciter sinusoidal signal 110, the example first phase-shifted sinusoidal signal 502, and the example second phase-shifted sinusoidal signal 504 for determining phase differences between the example exciter sinusoidal signal 110 and the example first phase-shifted sinusoidal signal 502, and between the example exciter sinusoidal signal 110 and the example second phase-shifted sinusoidal signal 504, even where signal variations around the common-mode reference signal 122 exist. As illustrated in FIG. 9, the example zero-cross detector 600 receives as inputs the example exciter sinusoidal signal 110, the common-mode reference signal 122, the example first phase-shifted sinusoidal signal 502, and the example second phase-shifted sinusoidal signal 504. In some examples, the common-mode reference signal 122 is zero or a constant DC offset voltage. The example zero-cross detector 600 includes an example first amplifier 902a, an example second amplifier 902b, an example first comparator 904, an example second comparator 906, an example third comparator 908, an example first window comparator 910, and an example second window comparator 912.

Similar to the zero-cross detector 700 of FIG. 7A, the example first comparator 904 determines zero-crosses for the example exciter sinusoidal signal 110. The first comparator 904 compares the example exciter sinusoidal signal 110 and the common-mode reference signal 122, which it receives as inputs, and outputs the reference zero-cross signal 914. The comparator 904 may or may not be present. Its output 914 can be indirectly inferred without the use of 904 since sin(ωt) is generated within the IC. The example first comparator 904 identifies a zero-cross in the example exciter sinusoidal signal 110 when the exciter sinusoidal signal 616 (616 is NOT shown in FIG. 9) transitions from a value representing the exciter signal 110 being above the common-mode reference signal 122 to a value representing the exciter signal 110 being below the common-mode reference signal 122 or when the exciter zero-cross signal 616 transitions from a value representing the exciter signal 110 being below the common-mode reference signal 122 to a value representing the exciter signal 110 being above the common-mode reference signal 122.

The example first amplifier 902a amplifies the first phase-shifted sinusoidal signal 502 and the example second amplifier 902b amplifies the second phase-shifted sinusoidal signal 504. For example, the first phase-shifted sinusoidal signal 502 (e.g., sin(θ)*sin(ω*t+A)) is input into the first amplifier 902a, which outputs an amplified first output sinusoidal signal 916 (e.g., K*sin(θ)(ω*t+A)). The example second phase-shifted sinusoidal signal 504 (e.g., cos(θ)*sin(ω*t+A)) is input into the second amplifier 702b, which outputs an amplified second output sinusoidal signal 918 (e.g., K*cos(θ)*sin(ω*+A)). In some examples, the first amplifier 902a and the second amplifier 902b are implemented via one or more operational amplifiers (e.g., op-amps).

The example second comparator 906 of FIG. 9 determines zero-crosses for the example amplified first output sinusoidal signal 916. The second comparator 906 compares the example amplified first output sinusoidal signal 916 and the common-mode reference signal 122, which it receives as inputs, and outputs a first output sinusoidal zero-cross signal 920. In some examples, the first output sinusoidal zero-cross signal 920 is a high value (e.g., digital one or "true") when the example amplified first output sinusoidal signal 916 exceeds the common-anode reference signal 122, and the first output sinusoidal zero-cross signal 920 is a low value (e.g., digital zero or "false") when the example amplified first output sinusoidal signal 916 does not exceed the common-mode reference signal 122. In some examples, the first output sinusoidal zero-cross signal 920 is a low value (e.g., digital zero or "false") when the example amplified first output sinusoidal signal 916 exceeds the common-mode reference signal 122, and the first output sinusoidal zero-cross signal 920 is a high value digital one or "true") when the example amplified first output sinusoidal signal 916 does not exceed the common-mode reference signal 122.

The example second comparator 906 identifies a zero-cross in the example amplified first output sinusoidal signal 916 when the first output sinusoidal zero-cross signal 920 transitions from a value representing the example amplified first output sinusoidal signal 916 being above the common-mode reference signal 122 to a value representing the example amplified first output sinusoidal signal 916 being below the common-mode reference signal 122 or when first output sinusoidal zero-cross signal 920 transitions from a value representing the example amplified first output sinusoidal signal 916 being below the common-mode reference signal 122 to a value representing the example amplified first output sinusoidal signal 916 being above the common-mode reference signal 122.

The example third comparator 908 of FIG. 9 determines zero-crosses for the example amplified second output sinusoidal signal 918. The third comparator 908 compares the example amplified second output sinusoidal signal 918 and the common-mode reference signal 122, which it receives as inputs, and outputs a second output sinusoidal zero-cross signal 922. In some examples, the second output sinusoidal zero-cross signal 922 is a high value when the example amplified second output sinusoidal signal 918 exceeds the common-mode reference signal 122, and the second output sinusoidal zero-cross signal 922 is a low value when the example amplified second output sinusoidal signal 918 does not exceed the common-mode reference signal 122. In some examples, the second output sinusoidal zero-cross signal 922 is a low value when the example amplified second output sinusoidal signal 918 exceeds the common-mode reference signal 122, and the second output sinusoidal zero-cross signal 922 is a high value when the example amplified second output sinusoidal signal 918 does not exceed the common-mode reference signal 122.

The example third comparator 908 identifies a zero-cross in the example amplified second output sinusoidal signal 918 when the second output sinusoidal zero-cross signal 922 transitions from a value representing the example amplified second output sinusoidal signal 918 being above the common-mode reference signal 122 to a value representing the example amplified second output sinusoidal signal 918 being below the common-mode reference signal 122 or when the second output sinusoidal zero-cross signal 922 transitions from a value representing the example amplified second output sinusoidal signal 918 being below the common-mode reference signal 122 to a value representing the example amplified second output sinusoidal signal 918 being above the common-mode reference signal 122.

The example first window comparator 910 of FIG. 9 compares the example amplified first output sinusoidal signal 916 to a first threshold 924a and to a second threshold 924b and outputs a first output sinusoidal confirmation signal 926 corresponding to the result of the comparison. The first threshold 924a and the second threshold 924b may be configurable (e.g., programmable). In some examples, the first threshold 924a is the common-mode reference signal 122 plus twenty percent and the second threshold 924 is the common-mode reference signal 122 minus twenty percent (e.g., ±1.2*common-mode, ±0.2 if common-mode is zero)

Comparing the example amplified first output sinusoidal signal 916 to the first threshold 924a and the second threshold 924b facilitates determining when the example amplified first output sinusoidal signal 916 will approach common-mode (e.g., where an incorrect zero-cross indication is likely to occur). For example, the first window comparator 910 outputs a low value (e.g., 0) when the amplitude of the example amplified first output sinusoidal signal 916 is between the first threshold 924a and the second threshold 924b for a threshold amount of time. In some examples, the threshold amount of time corresponds to the period (e.g., the duration of one wave cycle) of the example amplified first output sinusoidal signal 916. In some examples, the amplitude of the example amplified first output sinusoidal signal 916 is between the first threshold 924a and the second threshold 924b for the threshold amount of time when the example amplified first output sinusoidal signal 916 approaches the common-mode reference signal 122. In such examples, the first output sinusoidal confirmation signal 926 identifies with a low value (e.g., 0) when the example amplified first output sinusoidal signal 916 approaches the common-mode reference signal. As discussed further in connection with FIG. 10, example methods and apparatus described herein ignore the second output sinusoidal zero-cross signal 920 when the first output sinusoidal confirmation signal 926 is low (e.g., 0).

The example second window comparator 912 of FIG. 9 compares the example amplified second output sinusoidal signal 918 to the first threshold 924a and to the second threshold 924b and outputs a second output sinusoidal confirmation signal 928 corresponding to the result of the comparison. Comparing the example amplified second output sinusoidal signal 918 to the first threshold 924a and the second threshold 924b facilitates determining when the example amplified second output sinusoidal signal 918 will approach the common-mode reference signal 122. For example, the second window comparator 912 outputs a low value (e.g., 0) when the amplitude of the example amplified second output sinusoidal signal 918 is between the first threshold 924a and the second threshold 924b for the threshold amount of time. In some examples, the amplitude of the example amplified second output sinusoidal signal 918 is between the first threshold 924a and the second threshold 924b for the threshold amount of time when the example amplified second output sinusoidal signal 918 approaches the common-mode reference signal 122. In such examples, the second output sinusoidal confirmation signal 928 identifies with a low value (e.g., 0) when the example amplified second output sinusoidal signal 918 approaches the common-mode reference signal 122. As discussed further in connection with FIG. 10, the first output sinusoidal zero-cross signal 920 is ignored when the first output sinusoidal confirmation signal 926 is low (e.g., 0) and the second output sinusoidal zero-cross signal 922 when the second output sinusoidal confirmation signal 928 is low (e.g., 0).

Figure 10:
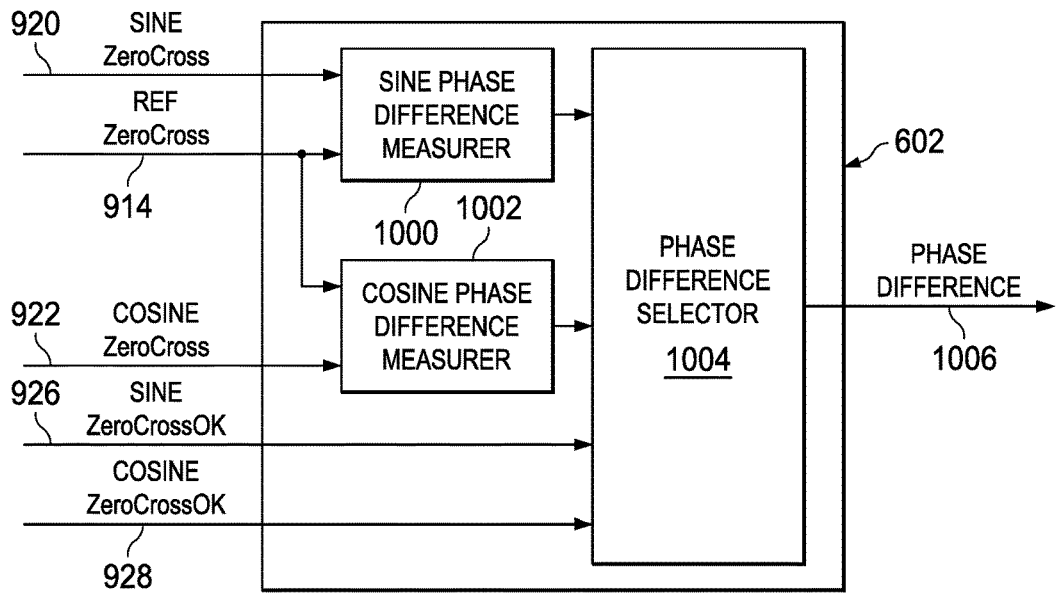
FIG. 10 is an illustration of an example implementation of the phase difference detector of FIG. 6 to determine phase differences based on the outputs of the zero-cross detector of FIG. 9.

FIG. 10 is a block diagram illustrating an example implementation of the phase difference detector 602 of FIG. 6. The example phase difference detector 602 includes an example first sinusoidal phase difference measurer 1000, an example second sinusoidal phase difference measurer 1002, and an example phase error selector 1004. In the illustrated example of FIG. 10, the output of the first sinusoidal phase difference measurer 1000 and the output of the second sinusoidal phase difference measurer 1002 are coupled to inputs of the phase error selector 1004.

The example first sinusoidal phase difference measurer 1000 receives as inputs the example exciter zero-cross signal 914 and the example first output sinusoidal zero-cross signal 920. The example first sinusoidal phase difference measurer 1000 determines a first time difference between when the example exciter zero-cross signal 914 transitions from a first value to a second value (e.g., from high to low or low to high) and when the example first output sinusoidal zero-cross signal 920 transitions from a first value to a second value (e.g., a zero-cross). For example, the first sinusoidal phase difference measurer 1000 determines a first time when the example exciter zero-cross signal 914 transitions from a first value to a second value, determines a second time when the first output sinusoidal zero-cross signal 920 transitions from a first value to a second value, and subtracts the first time from the second time. In some examples, the first time is a reference time such as, for example, zero, and the second time is equal to the first time difference. The example first sinusoidal phase difference measurer 1000 determines the phase difference "A" between the first phase-shifted sinusoidal signal 502 and the exciter reference signal 110 based on the first time difference. For example, Equation 6 illustrates an example equation for determining the phase difference based on the time difference:

$$\varphi = \omega * \Delta t \qquad \text{Equation 6}$$

where $\omega$=angular frequency in radians/second;
$\Delta t$=time difference in seconds The example second sinusoidal phase difference measurer 1002 of FIG. 10 receives as inputs the example exciter zero-cross signal 914 and the example second output sinusoidal zero-cross signal 922 as inputs. The example second sinusoidal phase difference measurer 1002 determines a second time difference between when the example exciter zero-cross signal 914 transitions from a first value to a second value (e.g., a zero-cross) and when the example second output sinusoidal zero-cross signal 922 transitions from a first value to a second value (e.g., a zero-cross). The example second sinusoidal phase difference measurer 1002 determines the phase difference "A" between the second phase-shifted sinusoidal signal 504 and the exciter reference signal 110 based on the second time difference.

The example phase error selector 1004 receives as inputs the output of the first sinusoidal phase difference measurer 1000, the output of the second sinusoidal phase difference measurer 1002, the example first output sinusoidal confirmation signal 926, and the example second output sinusoidal confirmation signal 928. The example phase error selector 1004 selects the output of the first sinusoidal phase difference measurer 1000 and/or the output of the second sinusoidal phase difference measurer 1002 based on the example first output sinusoidal confirmation signal 926 and the example second output sinusoidal confirmation signal 928. In some examples, the phase error selector 1004 is a multiplexor.

For example, when the example first output sinusoidal confirmation signal 926 is high and the example second output sinusoidal confirmation signal 928 is low, the example phase error selector 1004 selects the output of the first sinusoidal phase difference measurer 1000 as a phase difference 1006. In some examples, the phase difference 1006 is representative of the phase difference "A" between the modulated signal 520 and the exciter sinusoidal signal 110. In such examples, the phase error selector 1004 ignores the output of the second sinusoidal phase difference measurer 1002.

When the example first output sinusoidal confirmation signal 926 is low and the example second output sinusoidal confirmation signal 928 is high, the example phase error selector 1004 selects the output of the second sinusoidal phase difference measurer 1002 as the phase difference 1006 and ignores the output of the first sinusoidal phase difference measurer 1000.

In some examples, when the example first output sinusoidal confirmation signal 926 is high and the example second output sinusoidal confirmation signal 928 is high, the example phase error selector 1004 selects the lowest one of the output of the first sinusoidal phase difference measurer 1000 or the output of the second sinusoidal phase difference measurer 1002 as the phase difference 1006. In some examples, when the example first output sinusoidal confirmation signal 926 is high and the example second output sinusoidal confirmation signal 928 is high, the example phase error selector 1004 selects the highest one of the output of the first sinusoidal phase difference measurer 1000 or the output of the second sinusoidal phase difference measurer 1002 as the phase difference 1006. Example methods and apparatus disclosed herein are designed such that the example first output sinusoidal confirmation signal 926 and the example second output sinusoidal confirmation signal 928 are not both zero at a same time. However, in such cases, an error signal may be generated to signify an error state.

Figure 11:
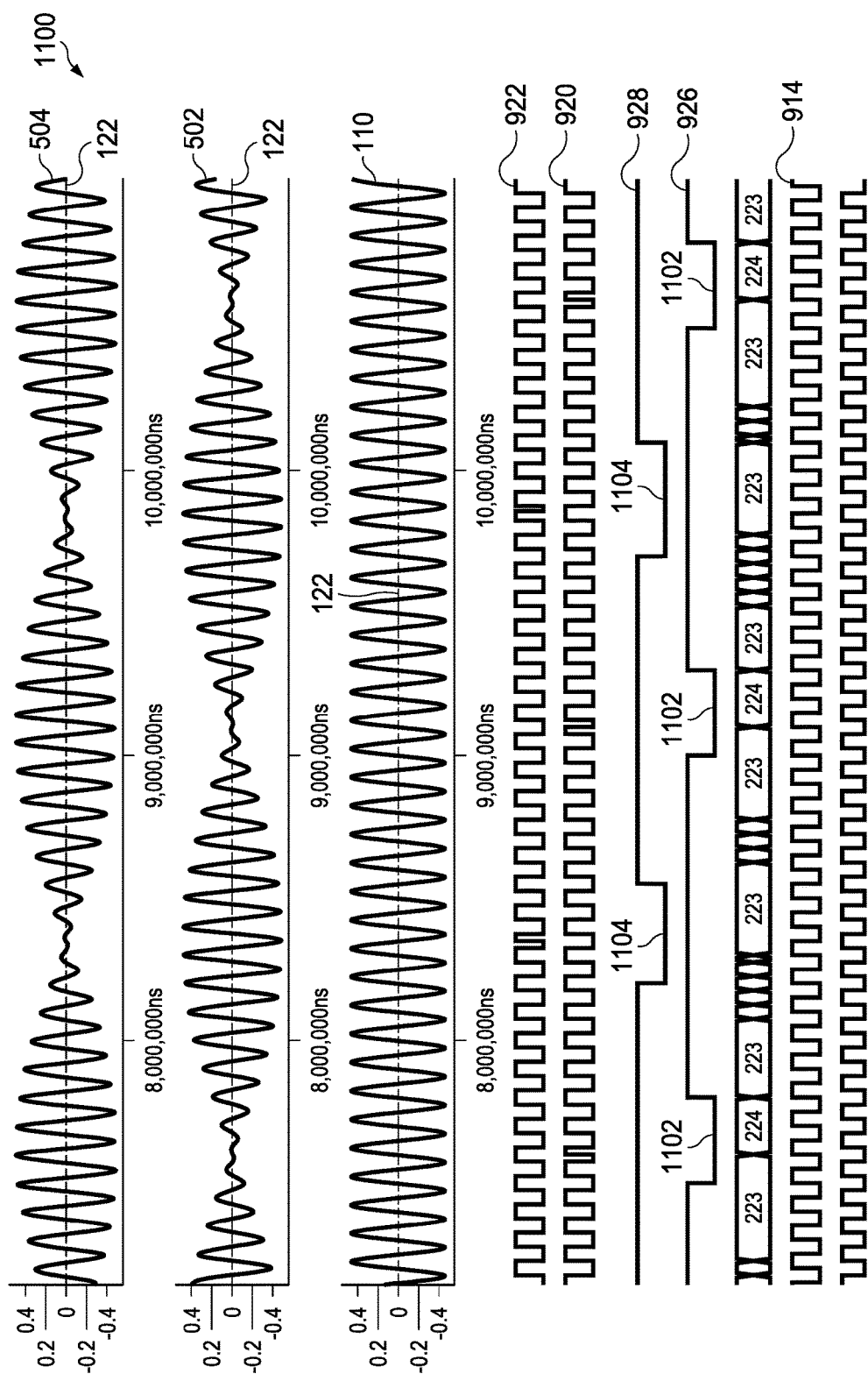
FIG. 11 is a graphical representation of the input and output signals of the example zero-cross detector of FIG. 9.

FIG. 11 is an example graphical representation 1100 of the first phase-shifted sinusoidal signal 502, the second phase-shifted sinusoidal signal 504, the exciter sinusoidal signal 110, the first output sinusoidal zero-cross signal 920 (e.g., the output of the second comparator 906), the second output sinusoidal zero-cross signal 922, the exciter zero-cross signal 914, the first output sinusoidal confirmation signal 926 (e.g., the output of the first window comparator 910), the second output sinusoidal confirmation signal 928 (e.g., the output of the second window comparator 912) and/or, more generally, the inputs and outputs of the example zero-cross detector 600.

As illustrated in FIG. 11, at first locations 1102, the example first output sinusoidal confirmation signal 926 is a low value (e.g., 0). In some examples, when the first output sinusoidal confirmation signal 926 is a low value, the phase difference detector 602 ignores the output of the first sinusoidal phase difference measurer 1000. At second locations 1104, the example second output sinusoidal confirmation signal 928 is a low value (e.g., 0). In some examples, when the second output sinusoidal confirmation signal 928, the phase difference detector 602 ignores the output of the second sinusoidal phase difference measurer 1002. In the illustrated example of FIG. 11, the first locations 1102 correspond to times where the first phase-shifted sinusoidal signal 502 approaches the common-mode reference signal 122 and the second locations 1104 correspond to times where the second phase-shifted sinusoidal signal 504 approaches the common-mode reference signal 122. Thus, the phase difference detector 602 ignores any errors associated with the first phase-shifted sinusoidal signal 502 or the second phase-shifted sinusoidal signal 504 approaching the common-mode reference signal 122.

Figure 12:
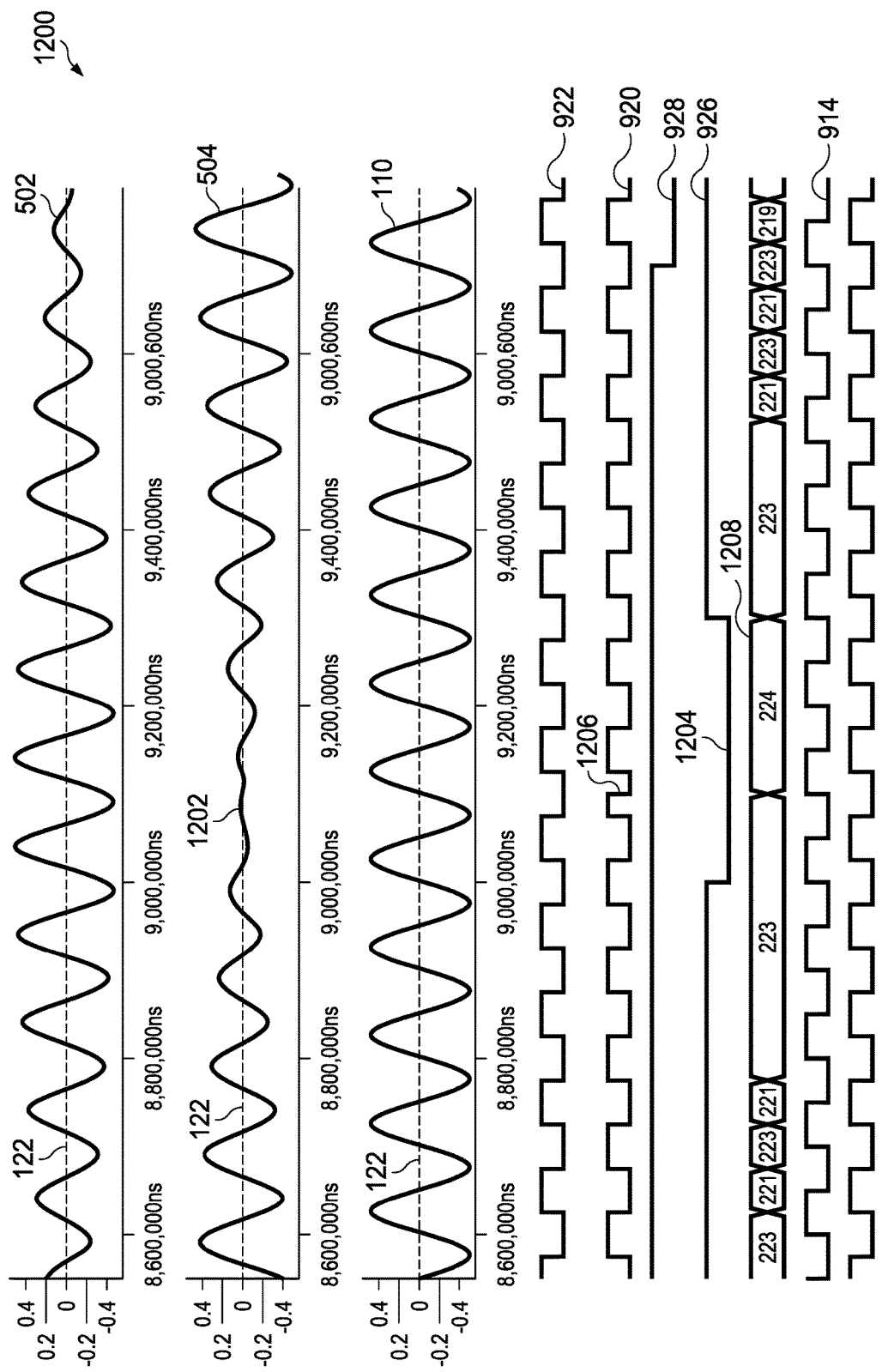
FIG. 12 is a graphical representation of the input and output signals of the example zero-cross detector of FIG. 9 and the example phase difference detector of FIG. 10.

FIG. 12 is an example graphical representation 1200 of the first phase-shifted sinusoidal signal 502, the second phase-shifted sinusoidal signal 504, the exciter sinusoidal signal 110, the second output sinusoidal zero-cross signal 920, the first output sinusoidal zero-cross signal 922, the exciter zero-cross signal 914, the first output sinusoidal confirmation signal 928, and the second output sinusoidal confirmation signal 926. In the illustrated example of FIG. 12, the second phase-shifted sinusoidal signal 504 approaches the common-mode reference signal 122 at a first time 1202. As the second phase-shifted sinusoidal signal 504 approaches the common-mode reference signal 122, the second output sinusoidal confirmation signal 926 is a low value (e.g., 0) at location 1204 and the second output sinusoidal zero-cross signal 920 incorrectly identifies a zero-cross at location 1206. As disclosed herein, such an incorrect identification of a zero-cross would otherwise lead to an incorrectly calculated phase difference. However, a correct phase difference 1208 is calculated, as illustrated in FIG. 12, because the output of the first sinusoidal phase difference measurer 1000 is ignored by the example phase error selector 1004 (FIG. 10). Accordingly, the phase difference 1208 is used as the phase difference "A" between the modulated signal 520 and the exciter sinusoidal signal 110.

While an example manner of implementing the example zero-cross detector 600 is illustrated in FIG. 9 and an example manner of implementing the example phase difference detector 602 is illustrated in FIG. 10, one or more of the elements, processes and/or devices illustrated in FIGS. 9-10 may be combined, divided, re-arranged, omitted, eliminated and/or implemented in any other way. Further, the example first amplifier 902a, the example second amplifier 902b, the example first comparator 904, the example second comparator 906, the example third comparator 908, the example first window comparator 910, the example second window comparator 912, the example zero-cross detector 600 of FIG. 9, the example first sinusoidal phase difference measurer 1000, the example second sinusoidal phase difference measurer 1002, the example phase error selector 1004, and/or the example phase difference detector 602 of FIG. 9 may be implemented by hardware software, firmware and/or any combination of hardware, software and/or firmware. Thus, for example, any of the example first amplifier 902a, the example second amplifier 902b, the example first comparator 904, the example second comparator 906, the example third comparator 908, the example first window comparator 910, the example second window comparator 912, the example zero-cross detector 600 of FIG. 9, the example first sinusoidal phase difference measurer 1000, the example second sinusoidal phase difference measurer 1002, the example phase error selector 1004, and/or the example phase difference detector 602 of FIG. 9 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example first amplifier 902a, the example second amplifier 902b, the example first comparator 904, the example second comparator 906, the example third comparator 908, the example first window comparator 910, the example second window comparator 912, the example zero-cross detector 600 of FIG. 9, the example first sinusoidal phase difference measurer 1000, the example second sinusoidal phase difference measurer 1002, the example phase error selector 1004, and/or the example phase difference detector 602 of FIG. 9 is/are hereby expressly defined to include a tangible computer readable storage device or storage disk such as a memory, a digital versatile disk (DVD), a compact disk (CD), a Blu-ray disk, etc. storing the software and/or firmware. Further still, the example zero-cross detector 600 of FIG. 9 and/or the example phase difference detector 602 of FIG. 10 may include one or more elements, processes and/or devices in addition to, or instead of, those illustrated in FIGS. 9-10, and/or may include more than one of any or all of the illustrated elements, processes and devices.

Figure 13:
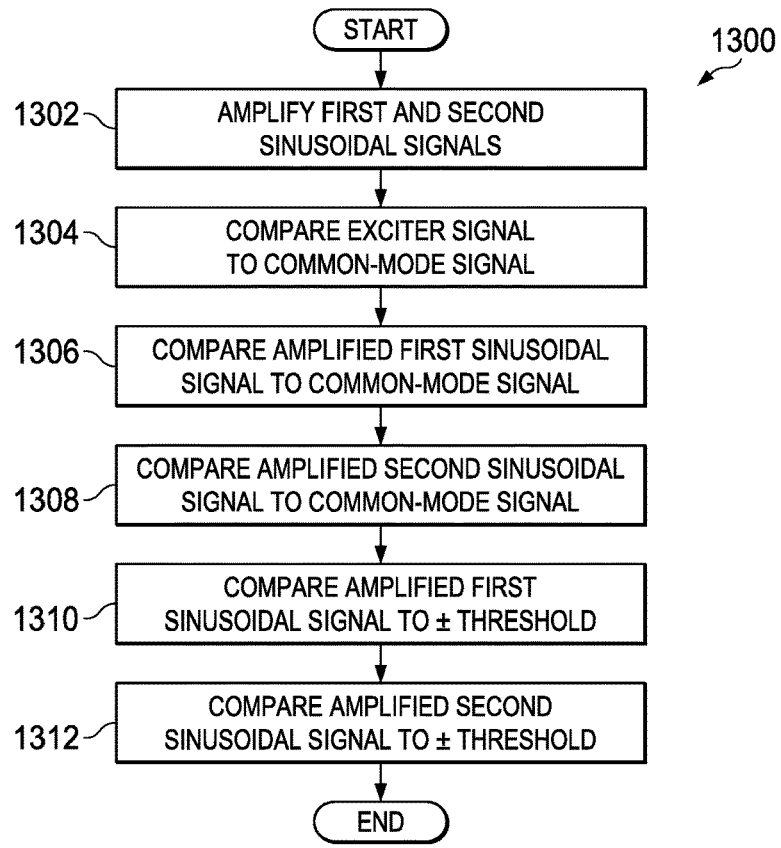
FIG. 13 is a process flow representative of an example method to implement the example zero-cross detector of FIG. 9.
Figure 14:
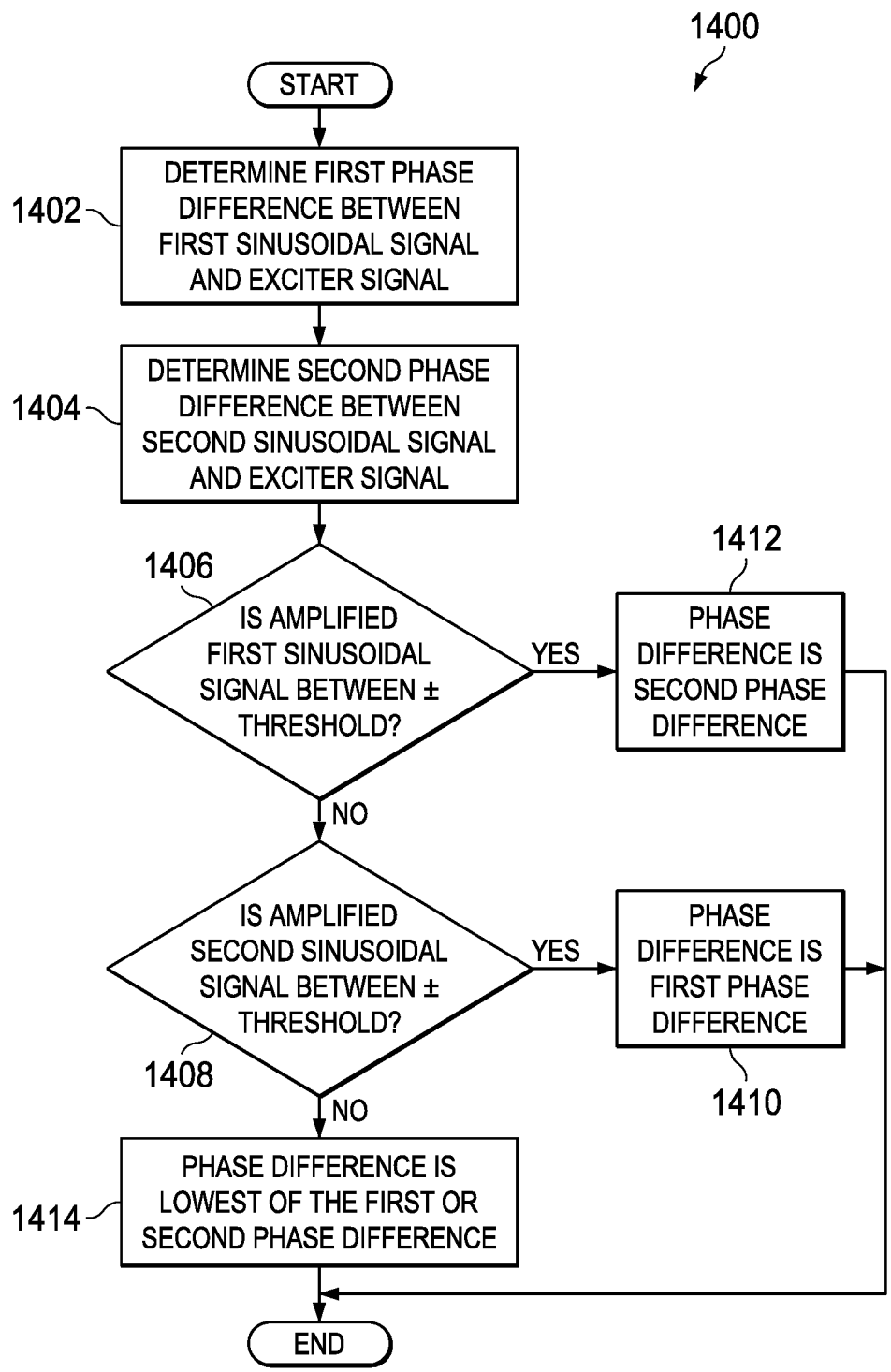
FIG. 14 is a flowchart representative of example computer-readable instructions, which may be executed to implement the example phase difference detector of FIG. 10.

A process flow representative of a method for implementing the example zero-cross detector 600 of FIG. 9 is shown in FIG. 13. A flowchart representative of example machine readable instructions for implementing the example phase difference detector 602 of FIG. 10 is shown in FIG. 14. In this example, the machine readable instructions comprise a program for execution by a processor such as the processor 1512 shown in the example processor platform 1500 discussed below in connection with FIG. 15. The program may be embodied in software stored on a tangible computer readable storage medium such as a CD-ROM, a floppy disk, a hard drive, a digital versatile disk (DVD), a Blu-ray disk, or a memory associated with the processor 1512, but the entire program and/or parts thereof could alternatively be executed by a device other than the processor 1512 and/or embodied in firmware or dedicated hardware. Further, although example methods are described with reference to the flowcharts illustrated in FIG. 13-14, many other methods of implementing the example zero-cross detector 600 of FIG. 9 and the example phase difference detector 602 of FIG. 10 may alternatively be used. For example, the order of execution of the blocks may be changed, and/or some of the blocks described may be changed, eliminated, or combined.

As mentioned above, the example process of FIG. 14 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example process of FIG. 14 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

A process flow 1300 of FIG. 13 begins at block 1302. At block 1302, the example first amplifier 902a (FIG. 9) amplifies the first phase shifted sinusoidal signal 502 and the example second amplifier 902b amplifies the second phase shifted sinusoidal signal 504. At block 1304, the example first comparator 904 (FIG. 9) compares the example exciter sinusoidal signal 110 to the example common-mode reference signal 122 to determine zero-crosses in the example exciter sinusoidal signal 110. At block 1306, the example second comparator 906 (FIG. 9) compares the example amplified first output sinusoidal signal 916 to the example common-mode reference signal 122 to determine zero-crosses in the example amplified first output sinusoidal signal 916. At block 1308, the example third comparator 908 (FIG. 9) compares the example amplified second output sinusoidal signal 918 to the example common-mode reference signal 122 to determine zero-crosses in the example amplified second output sinusoidal signal 918.

At block 1310, the example first window comparator 910 (FIG. 9) compares the example amplified first output sinusoidal signal 916 to the first threshold 924*a* and the second threshold 924*b* to determine windows in which the example amplified first output sinusoidal signal 916 is between the first threshold 924*a* and the second threshold 924*b*. At block 1312, the example second window comparator 912 (FIG. 9) compares the example amplified second output sinusoidal signal 918 to the first threshold 924*a* and the second threshold 924*b* to determine windows in which the example amplified second output sinusoidal signal 918 is between the first threshold 924*a* and the second threshold 924*b*. Thereafter, the example process flow 1300 ceases.

An example process 1400 for implemented the example the example phase difference detector 602 of FIG. 10 is illustrated in FIG. 14. The example process begins at block 1402. At block 1402, the example first sinusoidal phase difference measurer 1000 (FIG. 10) determines a first phase difference between the example first phase shifted sinusoidal signal 502 and the example exciter sinusoidal signal 110 based on the first output sinusoidal zero-cross signal 920 and the exciter zero-cross signal 914. At block 1404, the example second sinusoidal phase difference measurer 1002 (FIG. 10) determines a second phase difference between the example second phase shifted sinusoidal signal 504 and the example exciter sinusoidal signal 110 based on the second output sinusoidal zero-cross signal 922 and the exciter zero-cross signal 914.

At block 1406, the example phase error selector 1004 (FIG. 10) determines whether the example amplified first output sinusoidal signal 916 is between the first threshold 924*a* and the second threshold 924*b* based on the 926. If the example amplified first output sinusoidal signal 916 is not between the first threshold 924*a* and the second threshold 924*b* (block 1406: NO), then the example amplified first output sinusoidal signal 916 can be utilized to determine the phase difference "A" between the modulated signal 520 and the exciter sinusoidal signal 110 and control proceeds to block 1408.

At block 1408, the example phase error selector 1004 (FIG. 10) determines whether the example amplified second output sinusoidal signal 918 is between the first threshold 924*a* and the second threshold 924*b* based on the second output sinusoidal confirmation signal 928. If the example amplified second output sinusoidal signal 918 is between the first threshold 924*a* and the second threshold 924*b* (block 1408: YES), then the example amplified second output sinusoidal signal 918 is approaching the common-mode reference signal 122 and is not utilized to determine the phase difference "A" between the modulated signal 520 and the exciter sinusoidal signal 110 and control proceeds to block 1410. At block 1410, the example phase error selector 906 selects the first phase difference (e.g., determined at block 1402) as the phase difference "A" between the modulated signal 520 and the exciter sinusoidal signal 110. Thereafter, the example program 1400 ceases.

If the example amplified first output sinusoidal signal 916 is between the first threshold 924*a* and the second threshold 924*b* (block 1406: YES), then the example amplified first output sinusoidal signal 916 is approaching the common-mode reference signal 122 and is not utilized to determine the phase difference "A" between the modulated signal 520 and the exciter sinusoidal signal 110 and control proceeds to block 1412. At block 1412, the example phase error selector 1004 selects the second phase difference (e.g., determined at block 1404) as the phase difference "A" between the modulated signal 520 and the exciter sinusoidal signal 110. Thereafter, the example program 1400 ceases.

If the example amplified second output sinusoidal signal 918 is not between the first threshold 924*a* and the second threshold 924*b* (block 1408: NO), then the example amplified second output sinusoidal signal 918 can be utilized to determine the phase difference "A" between the modulated signal 520 and the exciter sinusoidal signal 110 and control proceeds to block 1414. At block 1414, the example phase error selector 1004 selects the lowest one of the first phase difference (e.g., determined at block 1402) or the second phase difference (e.g., determined at block 1404) as the phase difference "A" between the modulated signal 520 and the exciter sinusoidal signal 110. Thereafter, the example program 1400 ceases.

Figure 15:
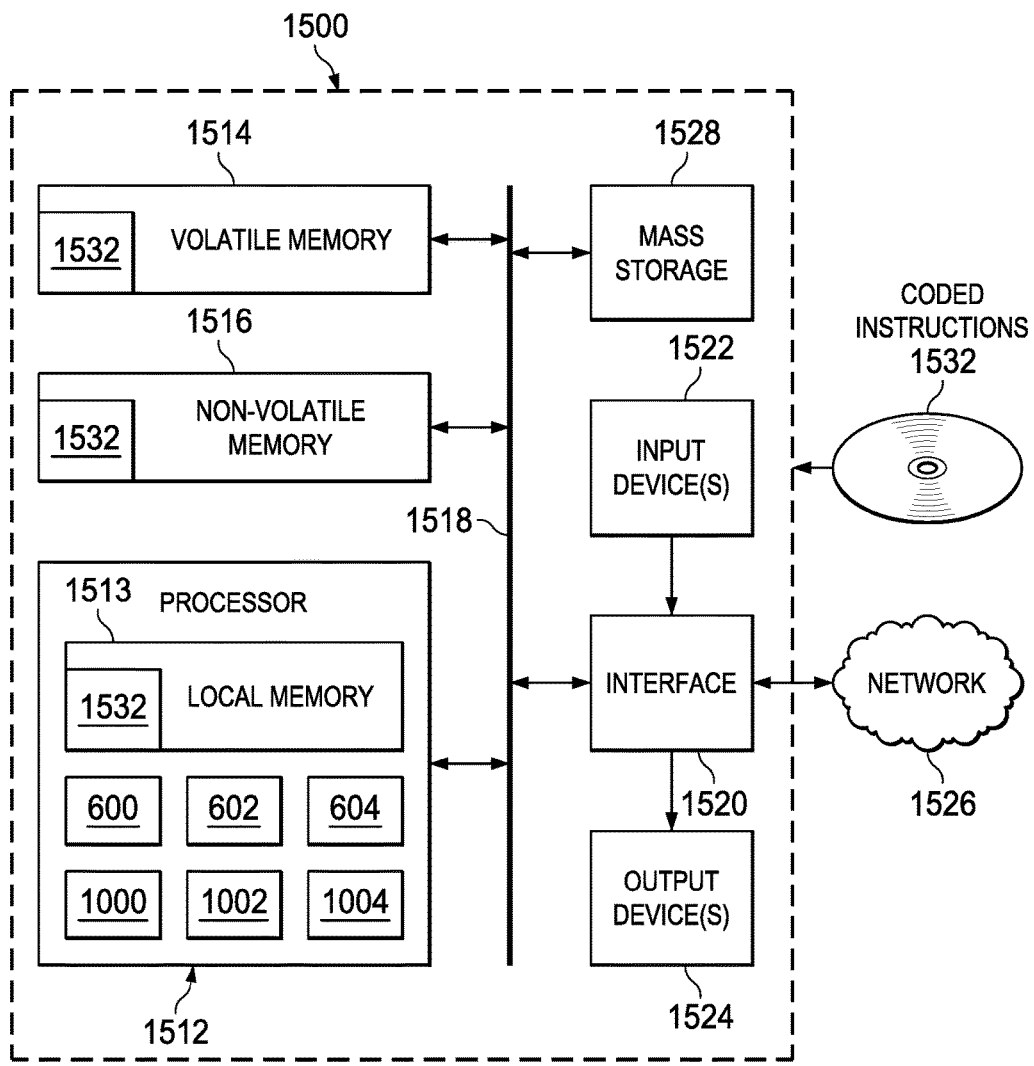
FIG. 15 is an example processor platform which may execute the method of FIG. 13 and/or the example computer readable instructions of FIG. 14 to implement the example zero-cross detector of FIG. 9 and/or the example phase difference detector of FIG. 10.

FIG. 15 is a block diagram of an example processor platform 1500 capable of executing the methods of FIGS. 13-14 to implement the example zero-cross detector 600 of FIG. 9 and/or the example phase difference detector 602 of FIG. 10. The processor platform 1500 can be, for example, a server, a personal computer, a mobile device (e.g., a cell phone, a smart phone, a tablet such as an iPad™), a personal digital assistant (PDA), or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

The coded instructions 1532 of FIG. 12 may be stored in the mass storage device 1528, in the volatile memory 1514, in the non-volatile memory 1516, and/or on a removable tangible computer readable storage medium such as a CD or DVD.

From the foregoing, it will be appreciated that example methods, apparatus and articles of manufacture have been disclosed to accurately determine the phase difference "A" between exciter sinusoidal signals and signals modulated by resolver-to-digital circuits; even where signal variations occur due to the signals approaching common-mode reference signals. The determined phase difference is used to demodulate the signals. The demodulated signals can be processed to recover the motor shaft angle that a resolver sensor measured. Accurate determination of the motor shaft angle is helpful in fully electric vehicle (EV) or industry robotic applications, which utilize resolvers for a variety of control systems that perform rotary/angular motion.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A zero crossing detector for a resolver-to-digital converter comprising:
    a first comparator having a common-mode signal input, an exciter signal input, and a reference zero crossing output;
    a second comparator having a common-mode signal input, a first sinusoidal signal input, and a sine zero crossing output;
    a third comparator having a common-mode signal input, a second sinusoidal signal input, and a cosine zero crossing output;
    a fourth comparator having a first threshold signal input, a second threshold signal input, an input coupled to the first sinusoidal signal input, and a first sinusoidal confirmation signal output; and
    a fifth comparator having a first input coupled to the first threshold signal input, a second input coupled to the second threshold signal input, a third input coupled to the second sinusoidal signal input, and a second sinusoidal confirmation signal output.

2. The detector as defined in claim 1, including a phase difference selector having a first input coupled to the reference zero crossing output and to the sine zero crossing output, a second input coupled to the reference zero crossing input and to the cosine zero crossing output, a third input coupled to the first sinusoidal confirmation signal output, a fourth input coupled to the second sinusoidal confirmation signal output, and a phase difference output.

3. The detector as defined in claim 2, in which the phase difference selector is a multiplexer.

4. The detector as defined in claim 2 including a first phase difference measurer having a first input coupled to the sine zero crossing output, a second input coupled to the reference zero crossing output, and an output coupled to the first input of the phase difference selector.

5. The detector as defined in claim 4 having a first input coupled to the cosine zero crossing output, a second input coupled to the reference zero crossing output, and an output coupled to the second input of the phase difference selector.

6. The detector as defined in claim 5, in which the phase difference selector selects as the phase difference output one of the output of the first phase difference measurer and the output of the second phase difference measurer.

7. The detector as defined in claim 6, in which the phase difference selector selects as the phase difference output one of the output of the first phase difference measurer and the output of the second phase difference measurer based on the third input and the fourth input.

8. A method of operating a resolver-to-digital converter comprising:
    comparing a first induced signal from a resolver sensor with a common-mode signal to determine a first zero-cross signal;
    comparing a second induced signal from the resolver sensor with the common-mode signal to determine a second zero-cross signal;
    comparing an excitation signal from the resolver sensor with the common-mode signal to determine a third zero-cross signal;
    comparing the first induced signal with a first threshold signal and a second threshold signal to determine a first zero-cross confirmation signal;
    comparing the second induced sinusoidal signal with the first threshold signal and the second threshold signal to determine a second zero-cross confirmation signal; and
    determining a phase difference between the excitation signal and one of the first and second zero cross signals in response to the first zero-cross confirmation signal, and the second zero-cross confirmation signal.

9. The method as defined in claim 8, including:
    when the first zero-cross confirmation signal is a high value, determining the phase difference based on the first zero-cross signal; and
    when the second zero-cross confirmation signal is a high value, determining the phase difference based on the second zero-cross signal.

10. The method as defined in claim 8, including determining a first potential phase difference based on the first zero-cross signal and the third zero-cross signal.

11. The method as defined in claim 10, including determining a second potential phase difference based on the second zero-cross signal and the third zero-cross signal.

12. The method as defined in claim 11, in which the determining of the phase difference includes selecting at least one of the first potential phase difference or the second potential phase difference.

13. The method as defined in claim 12, in which the selecting of the at least one of the first potential phase difference or the second potential phase difference is based on the first zero-cross confirmation signal and the second zero-cross confirmation signal.

14. The method as define in claim 8, including demodulating a signal of the resolver-to-digital converter based on the phase difference to determine a rotor position angle.

* * * * *